US009120165B2

(12) United States Patent
Marx et al.

(10) Patent No.: US 9,120,165 B2
(45) Date of Patent: Sep. 1, 2015

(54) ROBUST METHOD FOR SKIVING AND CORRESPONDING APPARATUS COMPRISING A SKIVING TOOL

(75) Inventors: Hartmut Marx, Düsseldorf (DE); Olaf Vogel, Ettlingen (DE)

(73) Assignee: Klingelnberg AG, Zurich (CH)

( * ) Notice: Subject to any disclaimer, the term of this patent is extended or adjusted under 35 U.S.C. 154(b) by 599 days.

(21) Appl. No.: 13/529,122

(22) Filed: Jun. 21, 2012

(65) Prior Publication Data
US 2012/0328384 A1 Dec. 27, 2012

(30) Foreign Application Priority Data
Jun. 21, 2011 (EP) .................................. 11170677

(51) Int. Cl.
B23F 5/16 (2006.01)
(52) U.S. Cl.
CPC ............... B23F 5/163 (2013.01); Y10T 407/17 (2015.01); Y10T 409/105088 (2015.01); Y10T 409/105565 (2015.01); Y10T 409/105883 (2015.01)
(58) Field of Classification Search
CPC .............. B23F 1/00; B23F 19/00; B23F 19/06
USPC ........... 409/36, 25, 38, 56, 57, 50, 51, 10–12, 409/34, 35, 33, 31
See application file for complete search history.

(56) References Cited

U.S. PATENT DOCUMENTS 3,399,599 A * 9/1968 Looman et al. ................. 409/34
4,173,920 A 11/1979 Sigman, Jr.
4,865,497 A 9/1989 Faulstich
8,819,936 B2 * 9/2014 Nagata ......................... 29/893.35
2004/0105731 A1 * 6/2004 Kreh ................................ 409/51
2009/0142153 A1 * 6/2009 Prock et al. ...................... 409/12
2011/0268523 A1 * 11/2011 Heinemann et al. ............ 409/12
2013/0266391 A1 * 10/2013 Schweiker et al. ............. 409/51

FOREIGN PATENT DOCUMENTS

DE 243514 3/1910
DE 39 15 976 A1 11/1990
DE 4122460 C * 4/1992
DE 10 2007 015357 A1 10/2008
GB 1 537 877 A 1/1979

(Continued)

OTHER PUBLICATIONS

Machine Translation DE 4122460, performed on Jan. 15, 2015.*
Machine Translation WO 2007/009851, performed on Jan. 15, 2015.*

(Continued)

*Primary Examiner* — Daniel Howell
*Assistant Examiner* — Nicole N Ramos
(74) *Attorney, Agent, or Firm* — McCarter & English, LLP

(57) ABSTRACT

Method and an apparatus for setting up and plunging a skiving tool with respect to a work piece, on which a rotational-symmetric, periodic structure is to be manufactured with application of the skiving tool, wherein a radial feed motion in the direction of the work piece is performed, so to bring the skiving tool in contact with the work piece for the first time, and the skiving tool is plunged from the moment of the first contact down to a predetermined depth in a radial plunging movement, before the proper skiving of the rotation-symmetric, periodic structure is carried out.

13 Claims, 14 Drawing Sheets

(56) References Cited

FOREIGN PATENT DOCUMENTS

| | | | |
|---|---|---|---|
| GB | 2231520 A | * | 11/1990 |
| WO | WO 2007009851 A1 | * | 1/2007 |
| WO | WO 2010/060733 A1 | | 6/2010 |

OTHER PUBLICATIONS

Machine Translation WO 2010/060733, performed on Jan. 15, 2015.*

European Search Report for European Patent Application No. EP 11 17 0677, dated Dec. 2, 2011.

* cited by examiner

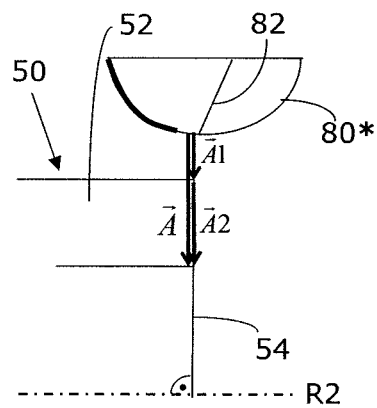
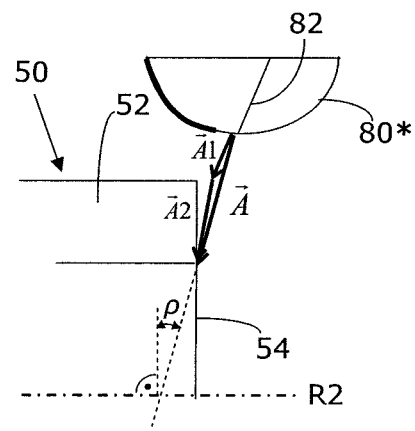
Fig. 12A  Fig. 12B
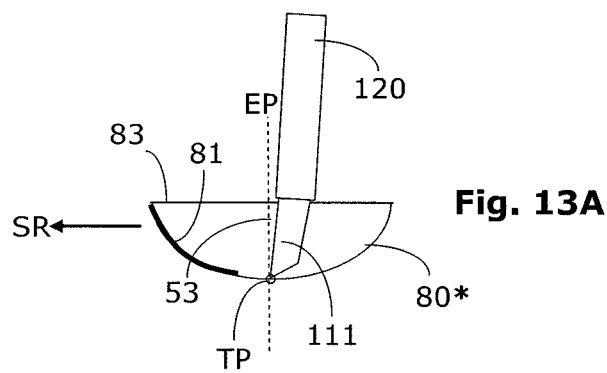
Fig. 13A
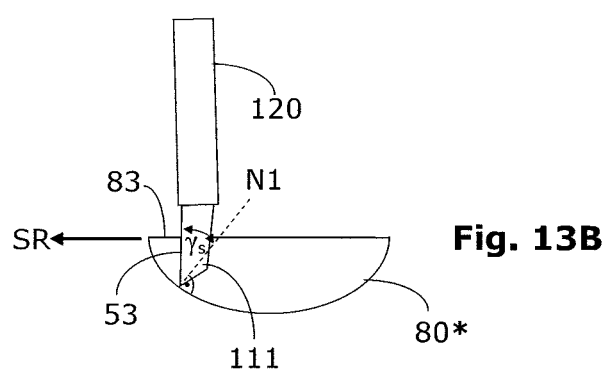
Fig. 13B

ROBUST METHOD FOR SKIVING AND CORRESPONDING APPARATUS COMPRISING A SKIVING TOOL

CROSS-REFERENCE TO RELATED APPLICATIONS

This application claims priority under 35 U.S.C. §119(a)-(d) to European Patent Application No. EP 111 70 677.6, filed Jun. 21, 2011, which is hereby incorporated by reference in its entirety as part of the present disclosure as if fully set forth herein.

FIELD OF THE INVENTION

The subject of the invention is a robust method for skiving a tooth system or another periodic structure and a corresponding apparatus comprising a skiving tool.

BACKGROUND OF THE INVENTION

There are numerous methods for the manufacturing of gear wheels. In the chip-cutting soft pre-machining, one distinguishes between hobbing, gear shaping, generating planing and skiving (also called power skiving). The hobbing and skiving are so-called continuous methods, as will be explained in the following in more detail.

In the chip-cutting manufacturing of gear wheels, one distinguishes between the intermitted indexing process (or also called single indexing process) and the continuous method, which is partly also called continuous indexing process or face hobbing.

In the continuous method, for example, a tool comprising corresponding cutters is applied in order to cut the flanks of a work piece. The work piece is being cut ready continuously, i.e., in an uninterrupted method, in one clamping. The continuous method is based on complex, coupled movement sequences, in which the tool and the work piece to be manufactured perform a continuous indexing motion relative to each other. The indexing movement results from the coordinated, respectively coupled driving of several axle drives of a corresponding machine.

In the single indexing process, one tooth gap is manufactured, then for example a relative movement of the tool and a so-called indexing movement (indexing rotation), in which the work piece rotates relative to the tool, are carried out, before then the next tooth gap is manufactured. A gear wheel is thus manufactured step by step.

The gear shaping method mentioned initially can be described or represented by a cylindrical gear transmission system, because the intersection angle (also called intersection angle of axes) between the rotation axis R1 of the shaping tool 1 and the rotation axis R2 of the work piece 2 amounts to zero degree, as represented schematically in FIG. 1. The two rotation axes R1 and R2 run parallel to each other, if the intersection angle of axes amounts to zero degree. The work piece 2 and the shaping tool 1 rotate continuously about their rotation axes R2 and R1, respectively. In addition to the rotary movement, the shaping tool 1 performs a stroke movement, which is referenced by the double arrow $s_{hx}$ in FIG. 1, and removes chips from the work piece 2 during this stroke movement.

Some time ago, a method was developed, which is called skiving. The basics are approximately 100 years old. A first patent application having the number DE 243514 on this subject dates back to the year 1912. After the initial considerations and investigations of the starting years, skiving was no longer seriously pursued further. At that time, complex processes, which were partly empirical, were necessary in order to find a suitable tool geometry for the skiving method.

About in the middle of the nineteen-eighties, skiving was taken up again. It was not until the present-day simulation methods and the modem CNC-controls of the machines, that the principle of skiving could be implemented in a productive, reproducible and robust method. The high wear resistance of present-day tool materials, the enormous high static and dynamic rigidity and the high performance of the synchronous running of modem machines aid in skiving.

In skiving, as shown in FIG. 2A, an intersection angle of axes Σ between the rotation axis R1 of the skiving tool 10 (also called skiving wheel) and the rotation axis R2 of the work piece 20 are predetermined, where the angle is different from zero. The resulting relative movement between the skiving tool 10 and the work piece 20 is a helical movement, which can be divided into a rotation portion (rotatory portion) and an advance portion (translative portion). A generation helical type gear transmission may be considered as a drive technology-related analogon, wherein the rotatory portion corresponds to the rolling and the translative portion corresponds to the gliding of the flanks. The greater the absolute value of the intersection angle of axes Σ, the greater translative movement is required for the manufacturing of the work piece 20. It effects namely a movement component of the cutting edges of the skiving tool 10 in the direction of the tooth flanks of the work piece 20. Thus, when skiving, the gliding portion of the relative combing movement of the engaging gear wheels of the equivalent helical gear transmission is utilized to perform the cutting movement. Only a slow axial advance is required in skiving and the so-called pushing movement, which is typical for the gear shaping, is dispensed with. Thus, a reverse stroke movement does not occur in skiving.

The cutting speed in skiving is influenced directly by the rotation speed of the skiving tool 10 with respect to the work piece 20 and by the utilized intersection angle of axes Σ of the rotation axes R1 and R2. The intersection angle of axes Σ, and thus the gliding portion, should be selected such that for the machining of the material, an optimum cutting speed is achieved for a given rotation speed.

The motion cycles and further details of a previously known skiving method can be taken from the previously mentioned schematic representation of FIG. 2A. FIG. 2A shows the skiving of an exterior tooth system on a cylindrical work piece 20. The work piece 20 and the tool 10 (here: a cylindrical skiving tool 10) rotate in opposite directions.

Further relative motions occur. An axial feed $s_{ax}$ is required in order to be able to machine the entire tooth system width of the work piece 20 with the tool 10. If a helical gearing is desired on the work piece 20 (i.e. $\beta_2 \neq 0$), then a differential feed $S_D$ is superimposed on the axial feed $s_{ax}$. A radial feed $S_{rad}$ may be employed in order to influence the crowning of the tooth system of the work piece 20.

In skiving, the vector of the cutting speed $\overline{v}_c$ results essentially as the difference of the two velocity vectors $\overline{v}_1$ and $\overline{v}_2$ of the rotation axes R1, R2 of the tool 10 and the work piece 20, which axes are slanted with respect to each other by the intersection angle of axes Σ. Here, $\overline{v}_1$ is the velocity vector at the periphery of the tool 10 and $v_c$ is the velocity vector at the periphery of the work piece 20. Thus, the cutting speed $v_c$ of the skiving process can also be changed by the intersection angle of axes Σ and the rotation speed in the equivalent helical gear transmission. The axial feed $s_{ax}$ has only a small influence on the cutting speed $v_c$, which can be neglected and is therefore not shown in the vector diagram with the vectors $\bar{v}_1$, $\bar{v}_2$ and $\bar{v}_c$ in FIG. 2A.

The skiving of an outer tooth system of a work piece 20 using a conical skiving tool 10 is shown in FIG. 2B. In FIG. 2B, the intersection angle of axes Σ, the vector of the cutting speed $\bar{v}_c$ the velocity vectors $\bar{v}_1$ at the periphery of the tool 10 and $\bar{v}_2$ at the periphery of the work piece 20 are shown again as well as the helix angle $\beta_1$ of the tool 10 and the helix angle $\beta_2$ of the work piece 20. In FIG. 2A, the helix angle $\beta_2$ is different from zero. The tooth head of the tool 10 is referenced with the reference numeral 4 in FIG. 2B. The tooth breast is referenced with the reference numeral 5 in FIG. 2B. The two rotation axes R1 and R2 do not intersect each other, but are arranged skew relative to each other. In a conical skiving tool 10, the calculation point AP is heretofore commonly chosen to be on the joint plumb of the two rotation axes R1 and R2, because a bending of the skiving tool 10 for providing relief angles is not necessary. The calculation point AP coincides with the so-called contact point here. The rolling circles of the equivalent helical gear transmission contact each other in this calculation point AP.

It is known from the German patent application DE 3915976 A1 that in skiving one can superimpose a radially directed movement on the slow axial feed in order to achieve modifications of the flank line. In this way, the crowning of a tooth system can be influenced.

In addition, it is known from the international patent application WO 2010/060733 A1 that by superimposing the axial feed with a radial movement, tooth systems can be generated, the tooth grooves of which phase out at the respective end radially and axially into the surface of the untoothed work piece. The mentioned international patent application concerns primarily a so-called multi-cut strategy, as indicated schematically in FIG. 3. In FIG. 3, the phasing out of a tooth groove 7 of a corresponding work piece 8 is shown. FIG. 3 shows several traces, which the skiving tool has formed in the work piece 8 during the multi-cut strategy. Due to the superimposition of the axial feed with the radial movement, a phasing out profile results at the end of the tooth groove 7, where the profile is composed of several curved segments in the area 9. The mentioned international patent application does not address the generation of completely generated tooth gaps.

In order to increase skiving productivity as much as possible, for example when utilizing modern cutting materials such as hard metals for the dry machining, the glide portion of the relative movement between the skiving tool and the work piece must generate sufficiently high cutting speeds. In skiving, the cutting speed $v_c$ is influenced directly by the rotation speed of the equivalent helical gear transmission, by the effective radii of the work piece with respect to the tool and by the intersection angle of axes Σ of the rotation axes R1 and R2. The possible rotation speed is limited here by the allowed rotation speeds of the machining apparatus (skiving machine) utilized. The size of the work piece is fixedly predetermined. The possible size of the tool is limited by the working space of the machining apparatus (skiving machine) and for inner tooth systems also by the inner space of this tooth system itself. Thus, sufficiently high cutting speeds can often be generated only by correspondingly high intersection angle of axes Σ.

In skiving, a tool 10 comes to application, which comprises at least one geometrically determined cutting edge. The cutting edge/edges are not shown in FIGS. 2A and 2B. The shape and arrangement of the cutting edges belong to those aspects, which must be taken into account in a concrete design in practice.

In addition, in skiving, the tool itself inheres great relevance. In the example shown in FIG. 2A, the skiving tool 10 has the shape of the straight-toothed spur wheel. The outer contour of the base body in FIG. 2A is cylindrical. However, it may also be bevel-shaped (also called conical) as shown in FIG. 2B. Because the one or plural teeth of the skiving tool 10 engage along the entire length of the cutting edge, each tooth of the tool 10 at the cutting edge requires a sufficient relief angle.

Starting from a straight-toothed or a helically toothed conical skiving tool 10, as shown in the FIGS. 4A and 4B, one recognizes that such a skiving tool 10 has so-called constructional relief angles due to the conical base shape of the skiving tool 10. That is the relief angles at the head and at the flanks of the conical skiving tool 10 are predetermined due to the geometry of the skiving tool 10. However, the profile of the cutting edges of a conical skiving tool 10, must satisfy certain conditions in order to actually enable a regrinding. In FIGS. 4A and 4B, a conical skiving tool 10 is shown during the cutting of outer teeth on a work piece 20. The so-called constructional relief angle $\alpha_{Ko}$ at the cutter head of the conical skiving tool 10 is visible in FIG. 4B. The intersection point of axes AK and the contact point BP of the rolling circles of the skiving tool 10 and the work piece 20 coincide in FIG. 4A and lie on the joint plumb GL (not visible respectively shown in the FIGS. 4A and 4B) of the rotation axes R1 and R2.

In FIG. 5, a further illustration of a straight-toothed or a helically toothed conical skiving tool 10 and cylindrical work piece 20 is shown, wherein the view of FIG. 5 has been chosen such that both rotation axes R1 and R2 extend parallel, although the two axes R1 and R2 are skew with respect to each other. In FIG. 5, the joint plumb GL of the two axes R1 and R2 is visible. The contact point BP lies on the joint plumb GL as shown in FIG. 5.

In the FIGS. 6A and 6B, a constellation of a cylindrical skiving tool 10 and a cylindrical work piece 20 comprising outer teeth is shown. The skiving tool 10 is not only arranged skew with respect to the rotation axis R2 of the work piece 20 (as can be recognized in FIG. 6A on the basis of the corresponding intersection angle of axes Σ), but is positioned with respect to the work piece 20 such that it is also inclined away from it by a small angle $\alpha_{Ki}$ (as can be seen well in FIG. 6B). By the insetting-in away of the skiving tool 10, an effective relief angle can thus be generated, which is shown in FIG. 6B for the head cutting edge as $\alpha_{Ki}$. Also at the side cutting edges of the tool, effective relief angles are generated by the insetting-in away. However, these turn out to be smaller than on the head cutting edge. Generally, these relief angles are only half as large.

Starting from a straight-toothed or a helically toothed cylindrical skiving tool 10, as shown in the FIGS. 6A and 6B, one recognizes that such a skiving tool 10 does not have so-called constructional relief angles, neither at the head nor at the flanks. If such a cylindrical skiving tool 10 was clamped in the conventional manner, no relief angles would be provided. By the insetting-in away of the skiving tool 10, a kinematic relief angle can be generated, as already described. In practice, the insetting-in away of the skiving tool 10 is achieved by an eccentric clamping of the skiving tool 10 in the machine, in order to thus effect an offset of the cutting face from the intersection point of axes AK. Due to the insetting-in away of the skiving tool 10, the contact point BP of the rolling circles of the skiving tool 10 and the work piece 20 no longer lies on the joint plumb of the rotation axes R1 and R2. The corresponding offset is also called cutting face offset e and can be recognized in FIG. 6A. The further the skiving tool 10 is inclined away, the greater the effective relief angles become. The relief angles required for skiving are in the range between 3 degrees and 5 degrees. In order to prescribe these relief angles, an insetting-in away of cylindrical skiving tools 10 of up to 10 degrees is required and common in practice.

In FIGS. 7A and 7B, further illustrations of a straight-toothed or a helically toothed cylindrical skiving tool 10 and a cylindrical work piece 20 are shown, wherein the view in FIG. 7A has been chosen such that the two rotation axes R1 and R2 extend parallel, although the two axes R1 and R2 are skew with respect to each other. In FIG. 7A, the joint plumb GL of the two axes R1 and R2 can be seen. In the FIGS. 7A and 7B, the contact point BP is located above the joint plumb GL. In FIG. 7B a so-called contact view (also called side projection of contact plane) is shown, in which the contact point BP is visible. In the representation of FIG. 7A, the contact point BP is hidden behind the work piece 20.

Own investigations of previous skiving methods have shown, that a sudden failure of the skiving tool may occur. More detailed considerations and evaluations have shown that extremely negative rake angles may occur during the skiving, among others. Simulations of the totality of the trajectory points of the cutting edges, which cut into the material of the work piece have shown that in the complete cutting of the gap, the effective head rake angle becomes particularly more and more negative from the beginning of the chip formation up to the exit of the skiving tool from the gap. That is more precisely, during the ablation of a chip in the common skiving, the chip thickness increases starting from the generator line, wherein the effective rake angle decreases continuously starting from approximately zero degree initially. At the end of the formation of a chip at the cutter head, this effective rake angle may amount to for example up to −60 degrees or in very unfavorable cases even less than −60 degrees. This aspect may lead to a premature wearing of the skiving tool.

The movement of the cutting tooth 6 of a skiving tool 10 through the material of a work piece 20 is represented schematically in the FIGS. 8A to 8C. The FIGS. 8A to 8C show the effective progression of the rake angle at the cutter head, respectively at the cutting tooth 6, over the course of the cut during the complete cut. Due to the superimposition of the coupled, i.e. mutually synchronized rotational motions of the skiving tool 10 about the first rotation axis R1 and of the work piece about the second rotation axis R2, and of linear axial movements of the skiving tool 10 relative to the work piece 20, in a record of the totality of the trajectory points of a cutter, there result a sort of trough- or hutch-shape, as shown in FIGS. 8A to 8C, 9, 10 and 11A, 11B. In FIGS. 8A to 8C, 9 and 10, the corresponding trough is referenced with the reference numeral 11.

FIG. 8A shows the relative movement of the cutting tooth 6 of the skiving tool 10 in the material of the work piece 20 in a first snap shot. The orientation and position of the cutting edge 6.1 of the cutting tooth 6 is represented by a thick line. The trough 11 results from the totality of the trajectory points of the cutting edge 6.1 of the cutting tooth 6 lying in the gap 22 of the work piece 20 for one engagement of the cutting tooth 6 in this gap 22. The subsequent engagement of a further cutting tooth (this may be the same or another cutting tooth of the tool) also generates a trough 11, which is offset within the gap 22 in the axial direction due to the axial feed and the differential feed coupled therewith. Thus, the trough 11 moves stepwise (at least virtually) through the material of the work piece 20 during skiving. FIG. 8A shows a line 12 which divides the trough 11 in a left and a right section. The masked portion of the line 12 is shown as a dashed-dotted line. The line 12 delimits the superposition of two troughs from each other, which differ in their position by the feed between two directly successive engagements of cutting teeth. That is, the line 12 characterizes the intersection curve of the two troughs. For an infinitesimally small axial feed, this intersection curve corresponds to the so-called generator line. The total tooth gap can be considered as a set of such generator lines, which run through the material of the work piece 20 in the cutting direction. In the conventional skiving machining process comprising an axial feed, material is ablated by the driven cutting edge 6.1 from the work piece 20 only in the section starting from the generator line (i.e. in the concretely shown representation: to the left of the generator line). Material has already been ablated by the previous engagement of the tool in the cutting direction before the generator line (i.e. in the concretely shown representation: to the right of the generator line).

FIG. 8B shows a second snap shot of the simulation, wherein the cutting tooth 6 of the skiving tool 10 has moved in the material of the work piece 20 with respect to the situation in FIG. 8A by a distance further to the left in the cutting direction SR.

FIG. 8C shows a third snap shot of the simulation, wherein the cutting tooth 6 of the skiving tool 10 has moved in the material of the work piece 20 with respect to the situation in FIG. 8B still a distance further to the left in the cutting direction SR. In FIG. 8C, it is clearly visible that the cutting face of the cutting edge 6.1 of the cutting tooth 6 forms an acute angle with respect to the trough 11. The corresponding "critical" section is characterized in FIG. 8C with the reference numeral 13. Hence an extremely negative effective rake angle results in the section 13, as already mentioned.

During the skiving process, the effective rake angle of the head becomes particularly more and more negative, as already mentioned. In skiving, the blade angle of the cutting tooth 6 to the imagined bottom of the gap at the work piece 20 remains approximately constant. The head cutting edge of the cutting tooth 6 "grinds" over the bottom of the trough.

A section of a work piece 20 comprising plural teeth 21 and tooth gaps 22 is shown in FIG. 9. Now, if one considers the total progression of the movement in the skiving machining of a work piece 20, it is visible that the trough 11 moves through a tooth gap 22 until the tooth gap 22 is completely accomplished. The movement of the trough 11 through the tooth gap 22 is indicated by a directional arrow VR, which points in the feed direction. This feed direction is composed of the axial and the differential feed.

The above-mentioned investigations of the rake angle during the skiving hold in particular for the generation of a complete chip in the ongoing skiving process. However, they also provide important insights on the start of the skiving process, at which one must first "pierce" into the gap. In the common infeed of the skiving tool in the axial direction of the work piece, a first contact of the cutting tooth 6 with the work piece 20 occurs with a clearly negative effective rake angle. Thus, previously, the first chips are generated with conceivable bad chip cutting conditions. Due to the large negative rake angle at the first contact, the load on the cutting edge 6.1 is very high. The forces acting on the cutting edge 6.1 (in particular the edge of the cutting edge) thereby increase suddenly, which may lead to an immediate destruction of the cutting edge 6.1. This high load may explain the sudden, abrupt failure of the skiving tool 10 which has partly been observed. In the ongoing skiving process according to FIGS. 8A to 8C and 9, the adverse effective rake angles do also occur as mentioned above; however, the load on the cutting edge 6.1 is established continuously and not abruptly hereby. Thus, different wear or failure phenomena are concerned.

In the axial infeed which has been practiced previously, the trough 11 is guided at the side along the tooth gap 21 such that trough edge of the trough 11 having the worst cutting conditions touches the work piece 20 for the first time in the section of the front side 23 as shown in FIG. 10. This first contact occurs typically with the head section of the cutting edge 6.1 at the side of the feathering flank. The axial infeed is indicated in FIG. 10 by the arrow ZB. Hereby, the arrow ZB runs parallel to the rotation axis R2 of the tool 20.

SUMMARY OF THE INVENTION

It is an object of the present invention to provide a method and an apparatus for the chip cutting machining of the tooth flanks of a gear wheel or another periodic structure, which is characterized by a good productivity. The reduction of the machining time and the production cost per gear wheel is a main goal of the invention. On the other hand, the proposed method and the apparatus shall be robust and shall be suitable for application in series manufacturing, for example in the automotive sector.

A particular concern is to keep the tool cost as low as possible by improving the lifetime of the tools.

This object is solved according to the present invention by a method, which is called herein a skiving method with modified infeed strategy. The modified infeed strategy conceives that the setting-in and plunging occurs with a clear radial movement component, whereby in the setting-in a first contact between the skiving tool and the work piece results with an effective rake angle, which amounts approximately to zero degree. This effective rake angle results in that, due to the described trough shape, the bottom of the trough comes in contact with the material of the work piece first.

The modified infeed strategy can be applied in relation with the most different skiving methods, which are suitable for the manufacturing of rotationally symmetrical periodic structures.

The modified infeed strategy is designed for employment in the skiving of a work piece having a rotational-symmetric periodic structure with application of a skiving tool that is supported by a tool spindle. In the modified infeed method:

the skiving tool rotates continuously about a first rotation axis, the work piece rotates continuously and synchronously to the skiving tool about a second rotation axis, the skiving tool is set-in with a radial movement component in the direction of the work piece and is plunged into the work piece with a radial movement component down to the full depth, whereby at least during the plunging the first rotation axis extends skew-whiff with respect to the second rotation axis.

During the subsequent skiving, as from the reaching of the full depth, the rotating skiving tool performs a relative feed movement with respect to the rotating work piece in the direction of the second rotation axis, i.e., toward the end of the plunging, whereby also during the skiving the first rotation axis runs skew with respect to the second rotation axis.

It is characterizing for the modified infeed method according to the invention that the relative movement sequence (called relative movement) between the work piece and the skiving tool is predetermined and performed such that the cutting conditions on the cutting edges of the cutting teeth of the skiving tool lie in an optimum range during the first contact and during the plunging.

It is characterizing for the modified infeed method according to the invention that the point of the first contact of the skiving tool with the work piece during the plunging corresponds approximately to the deepest point TP of the trough.

According to an aspect of the invention, a slight translational movement may be superimposed on the setting-in and the radial plunging, whereby the resulting motion vector encloses an acute angle with a normal of the rotation axis of the work piece.

The invention is based on predetermining the relative motion of the skiving tool with respect to the work piece such that considerably favorable cutting conditions result with respect to the conventional axial plunging.

During the skiving that is performed according to the modified infeed method, material is progressively cut from the work piece until the teeth or the other periodic structures are formed completely.

The sudden occurrence of extremely negative rake angles at the cutting teeth of the skiving tool is avoided by the modified plunging method. In addition, the modified infeed method has the advantage that a considerably smaller inlet zone in the axial direction is required in comparison to the conventional axial infeed.

The tooth gaps can be brought directly to the full depth according to the invention and do not have to be formed using a multi-cut strategy in this case. Thus, the plunging occurs preferably down to the full depth. Generally, the infeed in relation with a one-cut strategy is concerned here.

In addition, skiving of tooth systems which are continuous at the beginning of the tooth system is concerned, i.e., skiving of tooth grooves which are closed at the beginning is not concerned here.

It is characterizing for the modified infeed method that no resulting, i.e., final, gap geometry is generated during the infeed by the removal of material. The final gap geometry is generated by the proper skiving machining only after the infeed.

In order to generate a tooth gap completely, it is sufficient according to the invention to set in a determinable position in the width direction of the tooth system a radial movement component with respect to the work piece and to plunge down to the full radial depth. The position of the radial plunging is determined preferably from the position of the generator line.

According to another aspect of the invention, in all embodiments, the first chip removal occurs at considerably favorable cutting conditions as compared to the conventional skiving methods. Thereby, the lifetime of the skiving tools is improved considerably and above all, the sudden break-down of a skiving tool is avoided.

According to another aspect of the invention, due to the radial setting-in, the point at which the skiving tool contacts the work piece for the first time lies in a range which assures a suitable effective rake angle of approximately zero degree at the cutting tooth of the skiving tool.

According to another aspect of the invention, the point, at which the skiving tool contacts the work piece for the first time, may lie directly in the transition region between the front side and the lateral area of the work piece.

According to another aspect of the invention, the point, at which the skiving tool starts its movement in the feed direction through the material of the work piece, may be determined by taking into the account the position of the generator line. In order to ensure only a short infeed path in the axial direction, the virtual generator line is positioned at a short distance in front of the front surface of the work piece to be machined, because material is cut only behind the generator line during the conventional skiving. As a positive side effect, a shortening of the machining time results from this positioning of the generator line.

In addition, it is possible to back out radially directly after the complete generation of a gap. The complete generation of a gap is reached, when the generator line of the material has left the work piece. Generally, as a positive side effect, a shortening of the machining time results from the radial backing out.

The rotation axis of the skiving tool is lined obliquely with respect to the rotation axis of the work piece at least during the plunging and during the skiving, i.e., the intersection angle of axes Σ is different from zero.

In addition, the skiving tool can be inclined in the direction towards the work piece or away from the work piece during the plunging and during the skiving, i.e., a tilt angle (with respect to an inclination angle) δ, which is different from zero, may be prescribed.

The absolute value of the inclination angle δ may be within an angle range between 2 degrees and 45 degrees and preferably between 5 degrees and 30 degrees.

In the accordingly modified plunging method a method is concerned that is employed in preparation of a continuous chip-cutting method. The plunging as such is also continuous and chip cutting.

In some embodiments, a skiving tool is employed, which is like a peeling wheel and which differs considerably from face mill cutter head tools.

According to an aspect of the invention, the skiving tool has a tool section like a peeling wheel, which tool section has cutting edges that are formed like cutting teeth projecting outwards obliquely.

According to an aspect of the invention, the skiving tool has a tool section like a peeling wheel, which tool section has the shape of a generating cutter, such as the shape of a disk-type cutter, a shank-type cutter or a deep counterbore-type cutter (e.g. according to DIN 3972 or DIN 5480).

The skiving tools like a peeling wheel according to the invention are designed either as so-called massive tools, i.e. tools are concerned which are substantially formed integrally, or they are formed as cutter head tools (herein called bar-cutter skiving wheel) which have a cutter head base body that is equipped with cutter cartridges, such as in the shape of bar cutters.

According to an aspect of the invention, the skiving tools may have so-called constructional relief angles. That is, the relief angles are predetermined based on the geometry of the skiving tool taking into account the kinematics.

The modified plunging method described and claimed can be applied to the most different tooth systems and other periodically repeating structures.

The invention provides a series of advantages with respect to the conventional axial plunging method, which are summarized in the following:
improved chip cutting situation;
better effective rake angle (particularly at the cutter head);
less wear of the tool;
extended lifetime of the tools;
lower piece costs for the tool;
no sudden breakdown of the tool;
better cost effectiveness.

The method according to an aspect of the invention can be executed in relation with both a dry and a wet machining.

The modified infeed cannot only be employed in relation with the manufacturing of outer tooth systems. It can be employed also advantageously in relation with the manufacturing of inner tooth systems.

Further details and advantages of the invention are described in the following with reference to embodiment examples and with reference to the drawings. In all the schematized drawings, for reasons of simplicity, the work piece and the skiving tool are reduced to the situation at the rolling circle (respectively at the work piece on the rolling cylinder). The represented conditions also hold for the entire tooth system with a tooth height.

BRIEF DESCRIPTION OF THE DRAWINGS

FIG. 12A shows a section of a work piece in a side view, wherein the setting-in and plunging is shown in a strongly schematized form;

FIG. 12B shows a section of a work piece in a side view, wherein the setting-in and plunging is shown in a strongly schematized form;

FIG. 13A shows a strongly schematized view of a trough together with a cutting edge of a bar cutter, wherein the rake angle amounts to approximately zero degree in the moment shown;

FIG. 13B shows a further strongly schematized view of a trough together with a cutting edge of a bar cutter, wherein the rake angle is clearly negative in the moment shown;

DETAILED DESCRIPTION OF EMBODIMENTS OF THE INVENTION

In the context of the present description terms are used, which find use also in relevant publications and patents. It is noted, however, that the use of these terms serves merely for a better understanding. The inventive idea and the scope of protection of the claims shall not be limited in their interpretation by the specific choice of the terms. The invention can be transferred without further ado to other terminology systems and/or technical areas. In other technical areas, the terms should be applied correspondingly.

Rotational-symmetric periodic structures are for example gear wheels comprising an inner and/or outer tooth system. However, for example, also break disks, clutches or gear elements and so on may be concerned. The skiving tools are suitable in particular for the manufacturing of pinion shafts, worm gears, annulus gears, gear wheel pumps, articulated ring joint hubs (articulated ring joints are applied in the vehicle industry to transfer the force from a differential to a vehicle wheel), splined shaft connections, sliding sleeves, belt pulleys, and so on. The periodical structures are also referenced herein as periodically repeating structures.

In the following, mention is made primarily of gear wheels, teeth and tooth gaps. However, as mentioned above, the invention can be transferred also to the other components comprising different periodical structures. For these other components, tooth gaps are not concerned in this case, but for example slots or grooves.

Figure 11A:
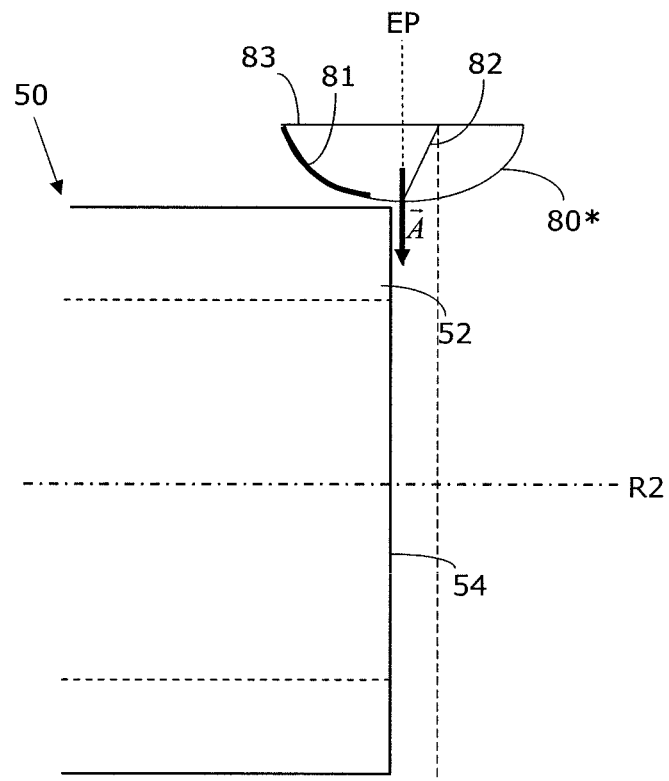
FIG. 11A shows a section of a work piece in a side view, wherein the position of the trough in the moment of the radial infeed according to the invention is shown in a strongly schematized form.

The invention uses the results of investigations and simulations as mentioned at the beginning. According to an aspect of the invention, the infeed occurs with a considerable radial movement component as shown in FIG. 11A. Due to the radially directed infeed, the unfavorable conditions during the first contact of the skiving tool 100 with the work piece 50, which have occurred up to now during the axial infeed, are avoided.

The radial infeed is referenced with an arrow and the reference numeral A in FIG. 11A.

According to the invention, a so-called modified infeed method is concerned, in which the skiving tool 100 and the work piece 50 perform a relative movement, which extends such that during the first contact of the skiving tool 100 with the work piece 50, an effective rake angle of approximately zero degrees occurs at the cutting edges of the skiving tool 100. In order to achieve this, at least the last phase of the movement during the setting-in is characterized by an essentially radial setting-in movement $\vec{A}1$ as shown in FIG. 12A. According to the invention, the radial plunging or infeed movement $\vec{A}2$ follows this radial setting-in movement $\vec{A}1$. During this radial plunging or infeed movement $\vec{A}2$, the cutting edges of the skiving tool plunge into the material of the work piece 50.

In FIG. 12A it is shown schematically, that the radial infeed A is composed of two partial movements $\vec{A}1$ and $\vec{A}2$, wherein in the case shown, both partial movements $\vec{A}1$ and $\vec{A}2$ are directed purely radially. The vector addition of the two partial movements $\vec{A}1$ and $\vec{A}2$ then results in the vector $\vec{A}$. The purely radial movements are perpendicular to the rotation axis R2 of the work piece 50, respectively, these movements extend parallel to the front face 54 of the work piece 50.

In FIG. 12B, it is shown schematically that the radial infeed A is composed of two partial movements $\vec{A}1$ and $\vec{A}2$, wherein in the case shown, both partial movements $\vec{A}1$ and $\vec{A}2$ have a considerable radial component and a small axial component. The resulting vector $\vec{A}$ results again from the vector addition of the two partial movements $\vec{A}1$ and $\vec{A}2$.

The two partial movements $\vec{A}1$ and $\vec{A}2$ may point in the same direction (see for example FIG. 12A), or they may have slightly different directions (see for example FIG. 12B).

FIG. 13A shows a strongly schematized view of a trough 80* together with a cutting edge 111 of a bar cutter 120, wherein the effective rake angle $\gamma_s$ at the head cutting edge in the moment shown amounts to approximately zero degree. In the projected representation, the effective rake angle $\gamma_s$ is chosen approximately the angle between the cutting face 53 of the cutting edge 110 and the normal N1 in the contact point between the cutting face 53 and the bottom of the trough 80*. In FIG. 13A, this normal N1 lies approximately in the plane of the cutting face 53. FIG. 13A shows the moment of the first contact of the skiving tool 100, respectively the cutting edge 111 of the skiving tool 100, with the material of the work piece 50, 70. The point of the first contact coincides approximately with the deepest point TP of the trough 80*. The generator line 82 runs through the deepest point TP of the trough 80*.

Figure 11B:
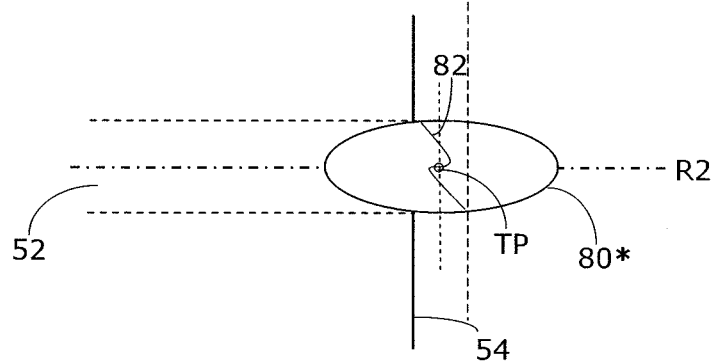
FIG. 11B shows a section of the work piece according to FIG. 11A in a top view, wherein the position of the trough in the moment of the radial infeed according to the invention is shown in strongly schematized form.

It is noted here that the troughs 80* in the FIGS. 11A, 11B and the following are intentionally represented mirror-symmetrically. In practice, the troughs 80* may, however, also have an asymmetrical shape, e.g. when the tilt angle δ is different from zero.

FIG. 13B shows a further strongly schematized view of a trough 80* together with a cutting edge 111 of a bar cutter 120, wherein the effective rake angle $\gamma_s$ at the head cutting edge in the moment shown is clearly negative. In FIG. 13B, the normal N1 is visible, because it does not lie in the plane of the cutting face 53. On the basis of the exemplifying and strongly schematized FIGS. 13A and 13B it becomes obvious, that the effective rake angle $\gamma_s$ becomes more and more negative with progressive movement of the cutting edge 111 in the cutting direction SR.

Figure 14:
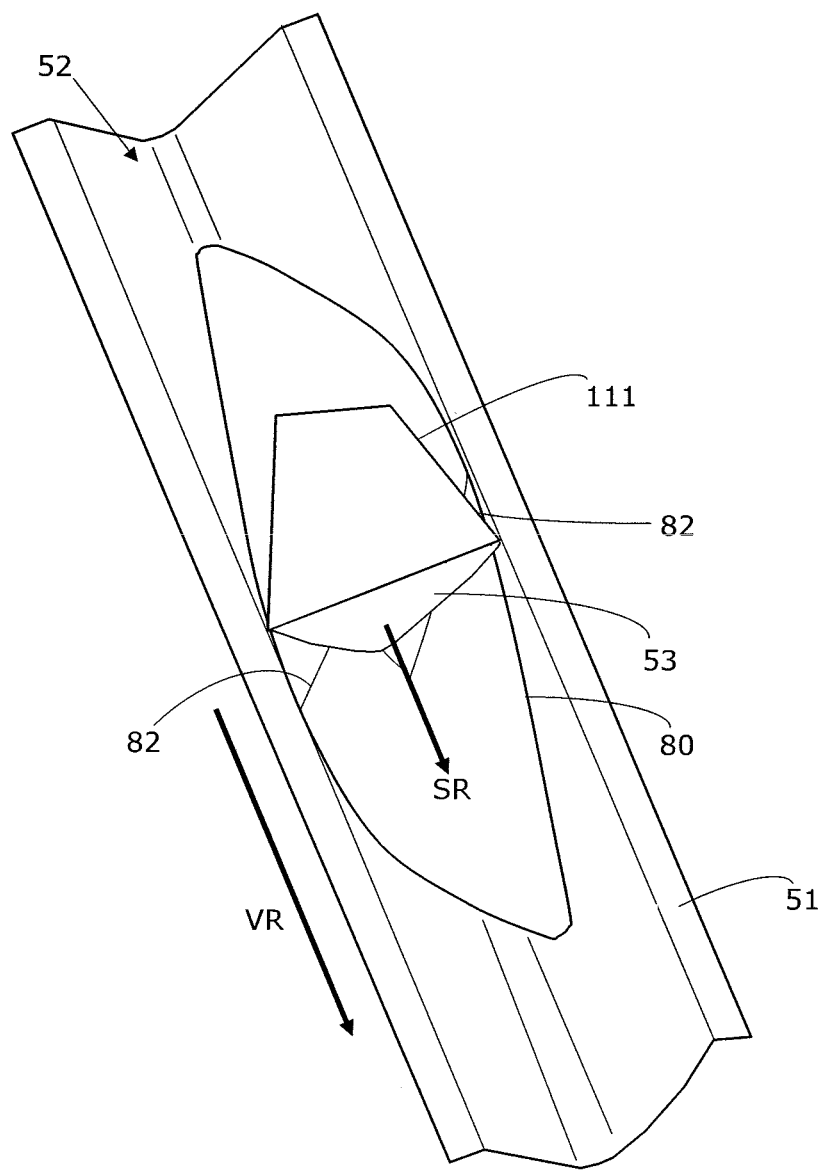
FIG. 14 shows a section of a work piece in a top view, wherein the position of the trough upon proceeding through a tooth gap is shown in a strongly schematized form.

It is important that the two partial movements $\vec{A}1$ and $\vec{A}2$ are performed with respect to the work piece 50 such that the generator line 82 comes to lie outside of the material of the work piece 50 before the axial feed movement is performed parallel to the rotation axis (i.e. in the feed direction VR, as shown in FIG. 14) of the work piece 50. In addition, it should be noted that the first partial movement $\vec{A}1$ is directed such that the first contact between the skiving tool and the work piece 50 occurs with a rake angle of approximately zero degree. When the axial movement component at the time of the first contact is too large, this condition may not be fulfilled under circumstances and a sudden strong beating load of the corresponding cutting edge(s) may result.

According to an aspect of the invention, the effective angle ρ between the resulting vector $\vec{A}$ and a normal on the rotation axis R2 is always an acute angle.

The absolute value of the effective angle ρ may be between 0 degree and 30 degrees.

The absolute value of the effective rake angle in the moment of the first contact may be between 0 degree and 5 degrees.

As mentioned previously, the superposition of the coupled rotational movement of the skiving tool 100 about the first rotation axis R1 and the work piece 50, 70 about the second rotation axis R2, and the linear axial movement of the skiving tool 100 relative to the work piece 50, 70 result in a kind of trough or hutch shape in a recording of the totality of the trajectory points of a cutting edge 111, as shown in the FIGS. 11A, 11B, 12A and 12B. The corresponding trough is referenced with the reference numeral 80 in these drawings.

This trough 80 results from the totality of the trajectory points of the cutting edge of the cutting tooth 110 positioned in the gap 52 of the work piece 50 (or 70) for one engagement of the cutting tooth 111 in this gap 52. The subsequent engagement of a further cutting tooth 111 (this may be the same or another cutting tooth 110 of the skiving tool 100) also generates a trough 80, which is offset due to the axial feed and the differential feed in the axial direction in the gap 52 coupled thereto. The trough 80 thus proceeds stepwise (at least virtually) through the material of the work piece 50 during the skiving. The line 82 delimits the superposition of two troughs relative to each other, which differ in their position by the feed between two directly subsequent engagements of the cutting tools. That is, the line 82 characterizes the intersection curve of the two troughs. For an infinitesimally small axial feed, this intersection curve corresponds to the so-called generator line. The total tooth gap 52 can be thought of as the set of such generator lines, which proceed in the cutting direction through the material of the work piece 50.

Figure 10:
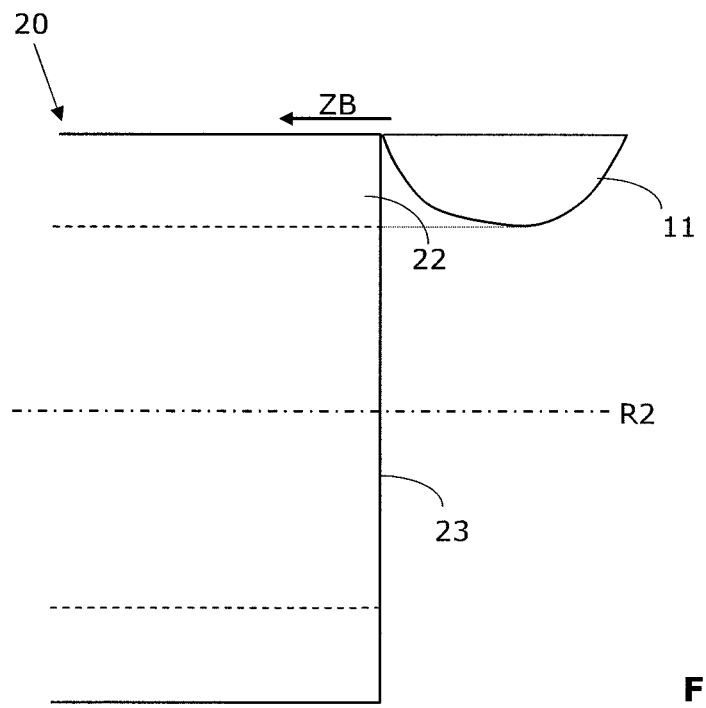
FIG. 10 shows a section of a work piece in a side view, wherein the position of the trough is shown in the moment of the axial infeed in a strongly schematized form.

The shape and size of the trough 80 varies during the radial infeed according to the invention, because the relative trajectory of the cutting teeth 111 and thus also of the cutting edges varies with the distance from the axis. This aspect is neglected in the FIGS. 11A, 11B, 12A, 12B, 13A and 13B. For a better identification, the trough is referenced with the reference numeral 80* in the infeed method according to the invention. In the conventional axial infeed, the troughs 11 are indeed always the same, as shown in FIG. 10.

During the radial infeed, the trough 80* is guided with the bottom of the trough heading, preferably with the deepest point TP of the trough 80* heading, in a mainly radially directed movement toward and to the work piece 50. By this novel form of the setting-in (first partial movement $\vec{A}1$ and the subsequent infeed (second partial movement $\vec{A}2$) it is avoided that the cutting edges of the skiving tool 100 plunge into the material of the work piece 50 with a clearly negative rake angle within the range of −15 degrees to −30 degrees or even a strongly negative rake angle in the range of more than −30 degrees. The according range of the trough 80*, which is avoided according to the invention, is referenced in the FIGS. 11A, 11B, 12B and 13A in a simplified and summarizing manner by a thick curve line 81. In practice, the trough 80* slides deeper and deeper into the material of the work piece 50, 70 during the infeed according to the invention, such that the relevant section of the curve line 81 increases more and more up to the full infeed depth. In the conventional axial infeed, the relevant section of the curve line 81 increases starting from the trough border 83, while during the radial infeed according to the invention, the curve line 81 increases starting from the bottom of the trough (at the deepest point of the trough 80*) in the direction of the trough border 83.

According to an aspect of the invention, for generating the tooth gap 52 completely, it suffices to infeed at a determinable infeed position EP along the tooth width of the tooth system radially instead of axially to the work piece 50, as shown in FIG. 11A. The infeed position EP may be determined from the position of the generator line 82 which is represented in the FIGS. 11A, 11B, 12A, 12B and 14 by a line. In FIG. 11B it is represented schematically that the deepest point TP of the trough 80* in the moment of the first contact lies slightly outside of the material of the work piece 50 or 70. In this moment, the deepest point TP of the trough 80* lies directly in front of the front face 54 of the work piece 50 or 70.

Thus the first chip removal occurs for clearly more favorable chip cutting conditions as compared to conventional skiving methods.

The skiving is a complex process, during which the cutting conditions at the cutting edge of the skiving tool 100 vary permanently, as represented on the basis of the trough 80. The relative movement sequences are optimized such that the section 81 of the trough 80 is avoided as much as possible during the first contact and in the initial phase of the infeed (called plunging).

Thus, on one-hand side, the avoiding of the section 81 comes to application during the first contacting of the skiving tool 100 with the work piece 50, in that it is lined clearly radially by a suitable first partial movement $\vec{A}1$, as described.

On the other-hand side, also during the infeed resp. plunging to the full depth of the tooth gap 52, care is taken that the cutting edges of the skiving tool do not go into the material of the work piece 50 with clearly or even strongly negative rake angles. For this reason, also the second partial movement $\vec{A}2$ is selected accordingly, whereby the second partial movement $\vec{A}2$ is performed such that an intermediate position is achieved at the end of the plunging, at which position the generator line 82 lies just outside of the gap 52 to be generated (analogously to FIG. 11B).

For determining the CNC-controlled movement of the machine, calculations are performed that are exact to the point for this purpose, so as to avoid unfavorable chip cutting conditions during the execution of the two partial movements $\vec{A}1$ and $\vec{A}2$ and to reach the correct intermediate position before the proper skiving of the gap 52 begins.

FIG. 14 shows a section of a work piece 50 in a top view, wherein the position of the trough 80 during the proceeding of a tooth gap 52 is shown in a strongly schematized form. Thus, FIG. 14 shows the proper skiving, which follows the modified infeed method. On the basis of FIG. 14, one can recognize the feed direction VR, the cutting direction SR, the position of the cutting tooth 111 and the schematized form of the cutting face 53. The feed direction VR extends in the direction of the gap and is composed of the axial feed and the differential feed of the work piece 50 coupled thereto. The cutting direction SR forms an acute angle with the feed direction VR. A line 82 at the trough 80 separates the section of the first cut trajectory from the section of a second cut trajectory, as already described. That is, this line 82 corresponds to the generator line that has been mentioned initially. On the basis of FIG. 14, one can recognize that the tool cutting edge of the cutting tooth 111 makes the trough-shaped surface 80 already described during the movement through the gap 52 to be generated, whereby the chip formation of the chip during the setting-in and plunging starts and occurs to a trough point such that no negative or only slightly negative relief angles occur initially and no clearly or strongly negative relief angles occur during the proceeding plunging at the cutting tooth 111.

Figure 15:
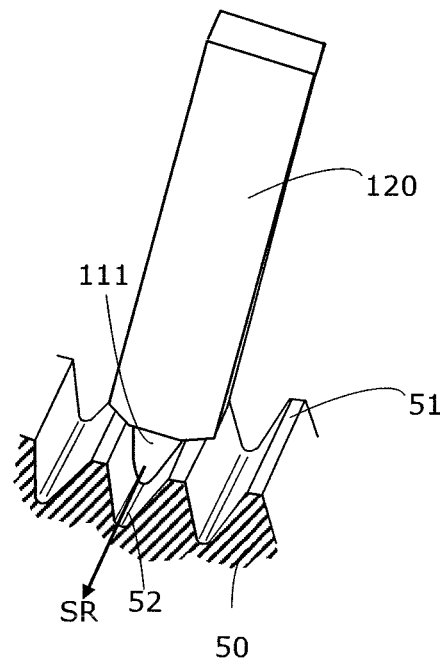
FIG. 15 shows a section of a work piece during the skiving, wherein it can be seen how a bar cutter having a cutting tooth of a skiving tool (not shown) is guided through a tooth gap.

FIG. 15 shows a section of a work piece 50 during skiving, whereby it can be seen how a bar cutter 112 comprising a cutting tooth 111 is guided through a tooth gap 52. The skiving tool 100 (called bar cutter skiving wheel 100) shown in FIG. 15 comprises a base body for receiving plural bar cutters 120. However, only one bar cutter 120 is shown here.

Figure 16:
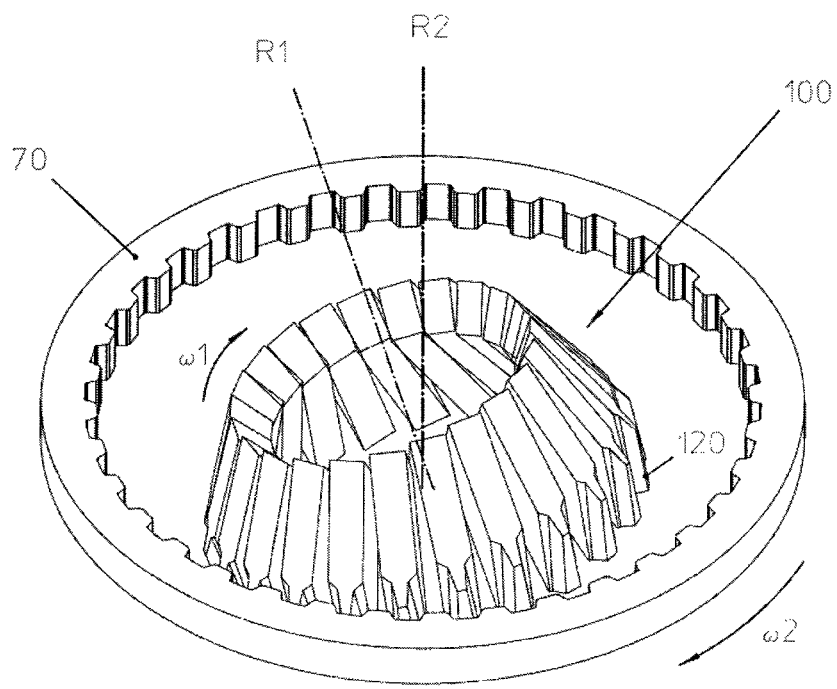
FIG. 16 shows a perspective view of a cylindrical work piece having inner tooth system during the skiving using a bar cutter skiving wheel according to the invention.

FIG. 16 shows a perspective view of a cylindrical work piece 70 having an inner tooth system during skiving using a bar cutter skiving wheel 100. In FIG. 16, only the bar cutters 120 are shown. The base body, in which the bar cutters 120 are born, is blanked out. Here, the bar cutters 120 are arranged in a conical constellation in the base body that is not shown.

Figure 17:
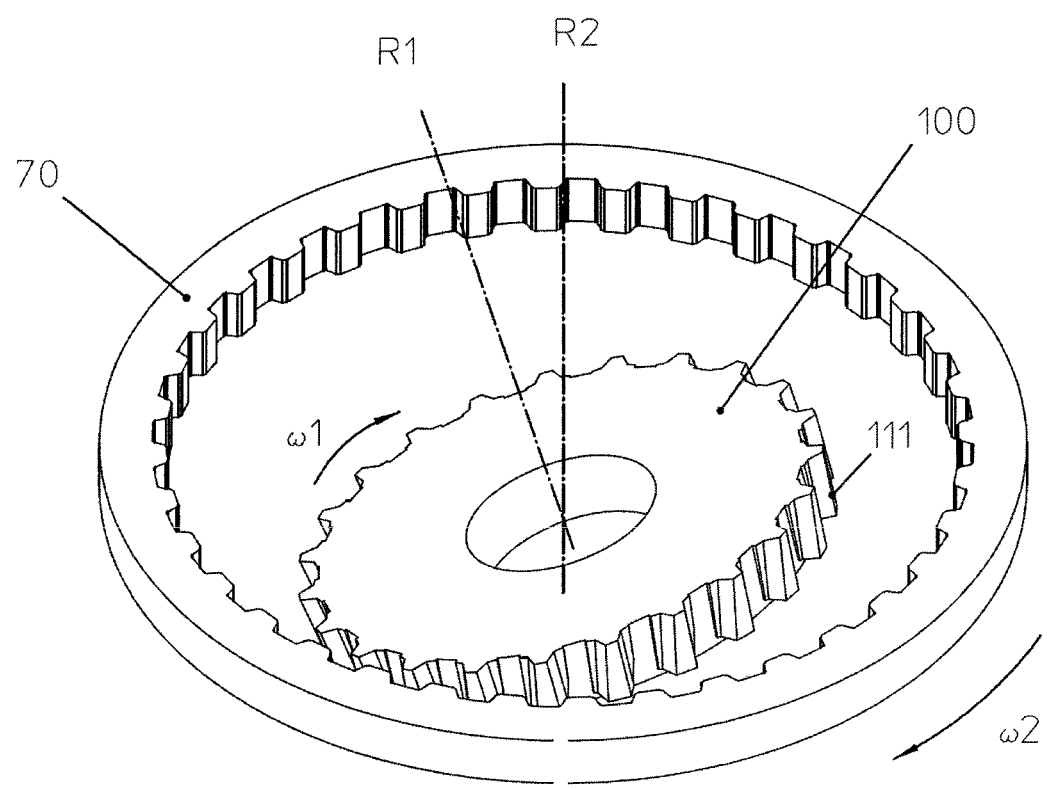
FIG. 17 shows a perspective view of a cylindrical work piece having an inner tooth system during the skiving with a massive tool as a skiving wheel, according to the invention.

FIG. 17 shows a perspective view of a further cylindrical work piece 70 having an inner tooth system during skiving using a massive tool 100 as a skiving wheel. The skiving wheel 100 has plural cutting teeth 111 as shown. The skiving wheel 100 may be formed integrally, i.e., the cutting teeth 111 are a fixed component of the disk-shaped base body.

In the following paragraphs, further explanations on the skiving are given.

In principle, the relative movement between the skiving tool 100 and the work piece 50, 70 corresponds to a helical gear transmission, also called generation helical gear type transmission. The helical gear transmission concerns a spatial gear transmission.

Figure 1:
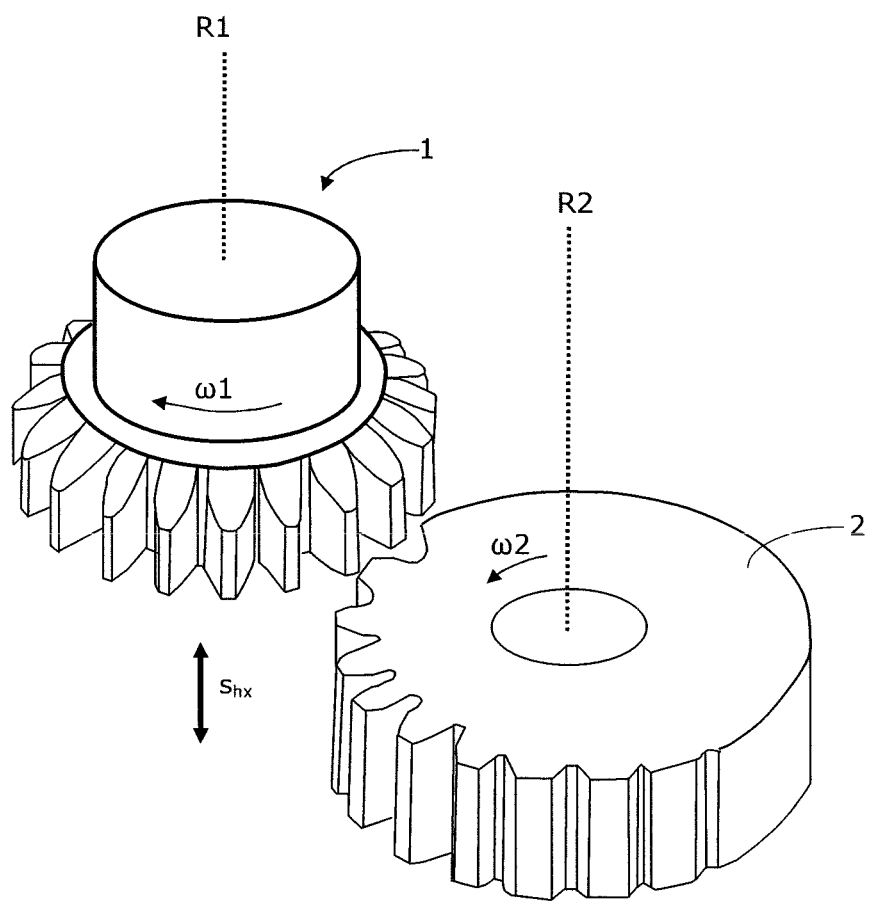
FIG. 1 shows a schematic representation of a prior art shaping wheel having a cylindrical outer contour in engagement with a work piece having an outer tooth system during the shaping.
Figure 2A:
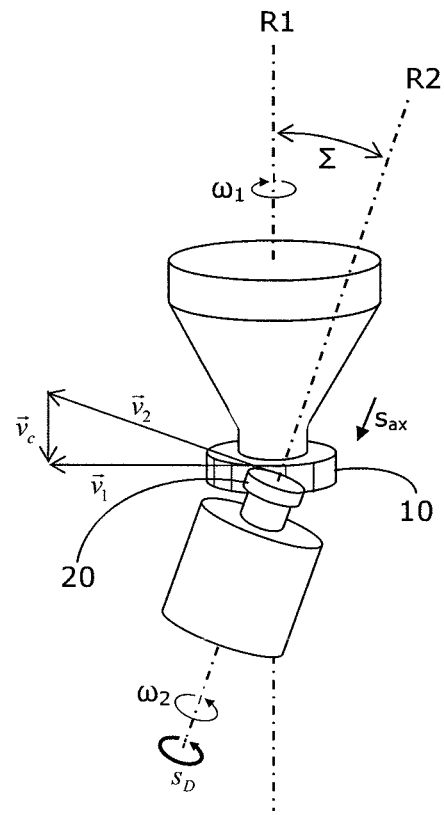
FIG. 2A shows a schematic representation of a prior art straight-toothed skiving wheel having a cylindrical outer contour in engagement with a work piece having an outer tooth system during the skiving.
Figure 2B:
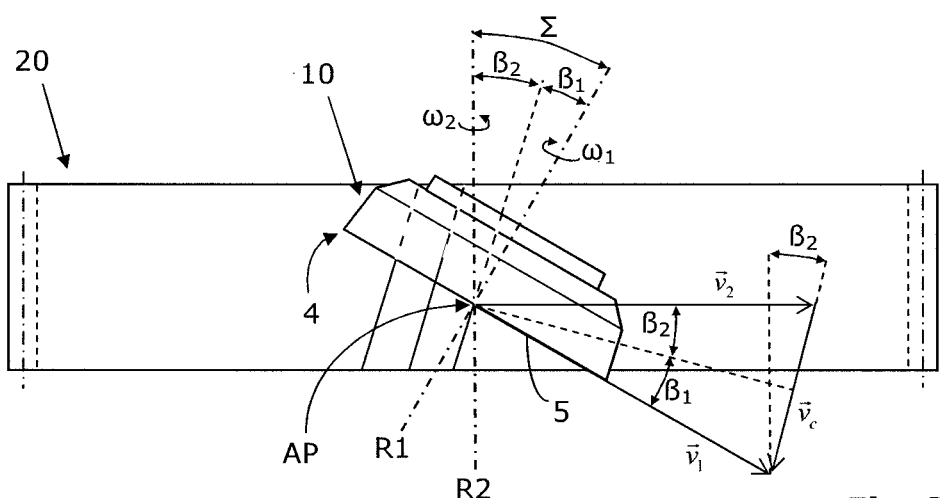
FIG. 2B shows a schematic representation of a prior art helically toothed skiving wheel having a conical outer contour in engagement with a work piece having an outer tooth system during the skiving.
Figure 3:
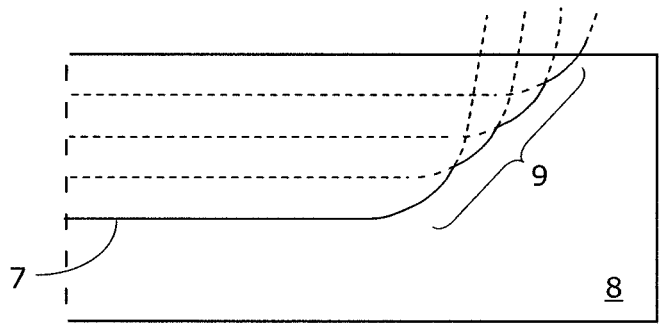
FIG. 3 shows a schematic sketch of a prior art tooth groove phasing out according to the international patent application WO 2010/060733.

The basic design of the skiving process therefore occurs as in the design of gear transmissions, at a so-called calculation point AP (see e.g. FIG. 2B). The term basic design is understood here to mean the definition of the spatial arrangement and movement of the skiving tool 100 respectively the work piece 50, 70 (kinematics) as well as the definition of the geometric basic quantities of the skiving tool 100, such as for example the diameter and the inclination angle (basic tool geometry).

At the calculation point AP, the geometrical and kinematic engagement conditions are designed as optimally as possible. The engagement conditions vary with increasing distance from the calculation point AP. In this respect, the skiving represents a very complex method, in which the engagement conditions vary very continuously also during the movement of the cutting edge. However, the varying engagement conditions can be influenced intentionally through the engagement conditions at the calculation point AP.

Therefore, the correct design of the engagement conditions at the calculation point AP have an essential meaning in the design of skiving processes.

There are several terms which are required for defining the arrangement of the axes. These terms are described in Table 1 below.

TABLE 1

Terms Concerning the Axis Arrangement

Figure 4A:
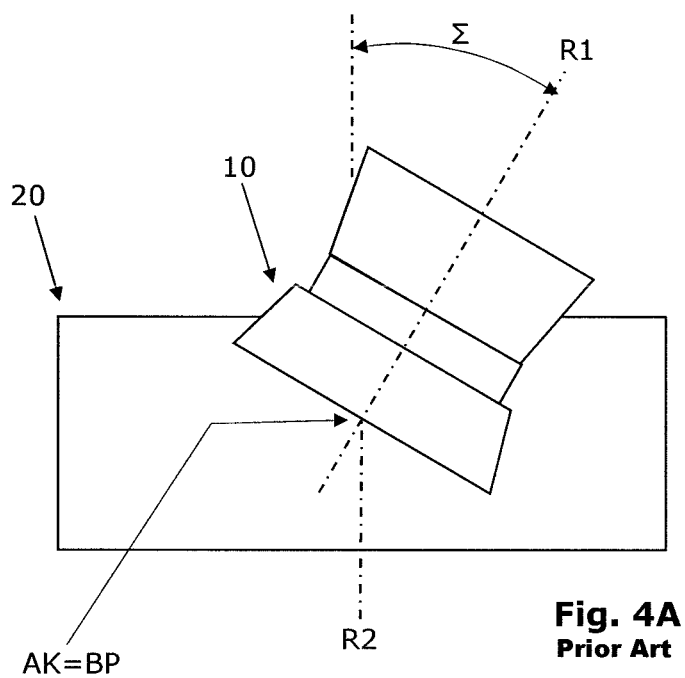
FIG. 4A shows a schematic projection of intersection of axes (projection of contact plane) of a prior art conical skiving tool during the skiving of a work piece having an outer tooth system, wherein an intersection angle of axes is predetermined.
Figure 5:
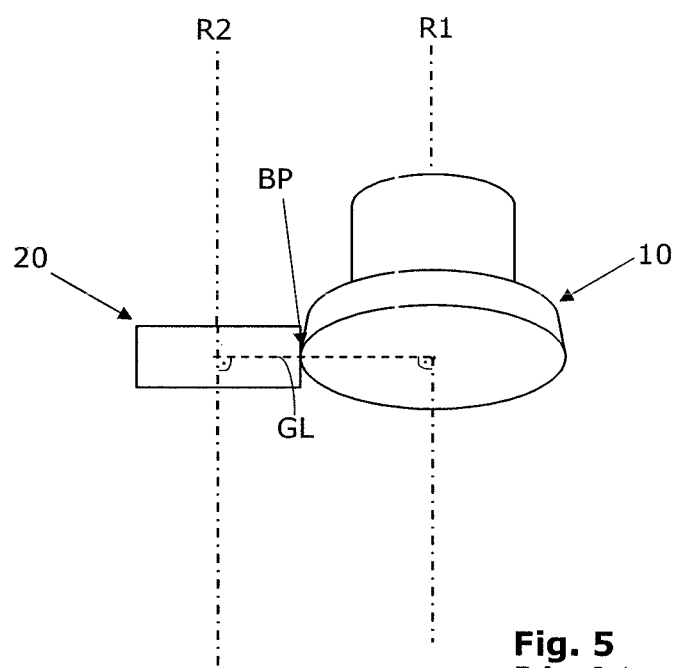
FIG. 5 shows a schematic view of a further prior art conical skiving tool during the skiving of a work piece having an outer tooth system, wherein the skiving tool is not oblique with respect to the work piece.
Figure 6A:
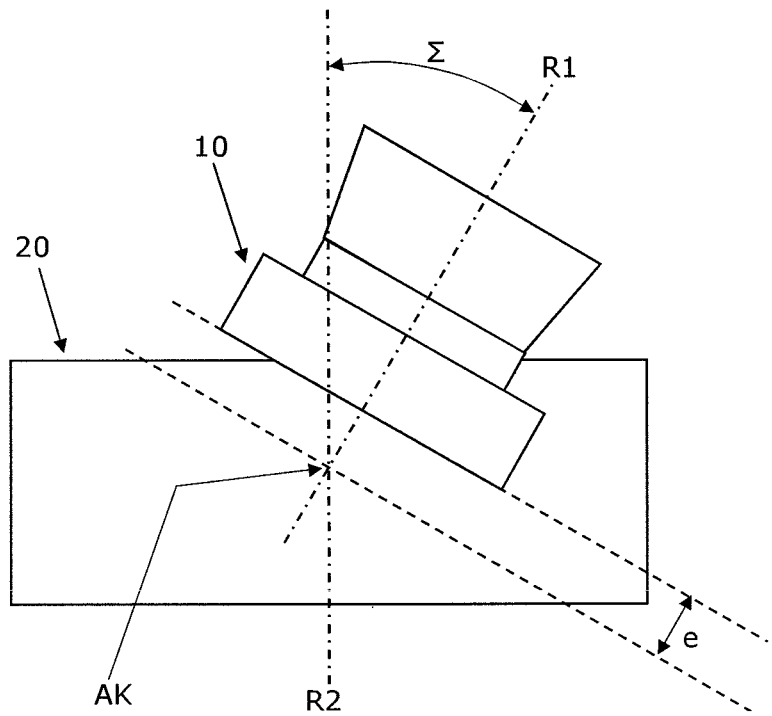
FIG. 6A shows a schematic projection of intersection of axes of a prior art cylindrical skiving tool during the skiving of a work piece having an outer tooth system, wherein the skiving tool is inclined away from the work piece with a small angle and wherein a cutting face offset results.

| | |
|---|---|
| joint plumb | Skiving processes are characterized by rotation axes R2 and R1 of the work piece 50, 70 and the skiving tool 100, which intersect in space. It is possible to specify uniquely the joint plumb GL for the two rotation axes R2 and R1 which are intersecting (see e.g. FIG. 5). |
| projection of intersection of axes, intersection point of axes | The view of the work piece 50, 70 and the skiving tool 100 along the joint plumb GL in the direction of the joint plumb vector is called projection of intersection of axes (see e.g. FIG. 4A and FIG. 6A). In the projection of intersection of axes, the projected rotation axes R1 and R2 intersect in the intersection point of axes AK, which corresponds to the joint plumb GL reduced to a point in the projection. |
| intersection angle of axes | The intersection angle of axes $\Sigma$ is, in respect of its absolute value, the smaller angle which is enclosed by the two rotation axes R1 and R2. It becomes visible in the projection of intersection of axes. In relation with the present invention, the following holds: $-90° < \Sigma < 90°, \Sigma \neq 0°$. The intersection angle of axes $\Sigma$ carries a sign. The sign is defined in the projection of intersection of axes without limitation of the generality as follows: For outer tooth systems, the intersection angle of axes $\Sigma$ is positive, if the projected rotation axis R1 is rotated about the intersection point of axes AK mathematically positively by $|\Sigma|$ with respect to the projected rotation axis R2. For inner tooth systems, it is positive, if the projected rotation axis R1 is rotated about the intersection point of axes AK mathematically and negatively by $|\Sigma|$ with respect to the projected rotation axis R2. |

There are several terms which are required for defining the arrangement of the axes. These terms are described in Table 2 below.

TABLE 2

Terms Concerning the Contact between the Skiving Tool and the Work Piece

| | |
|---|---|
| rolling circles | The rolling circles of the work piece 50, 70 and the skiving tool 100 contact each other in the calculation point AP, which is therefore also called contact point BP. The rolling circle of the work piece 50, 70 (also called work piece rolling circle) lies in a plane which is perpendicular to the rotation axis R2 of the |

TABLE 2-continued

Terms Concerning the Contact between the Skiving Tool and the Work Piece

| | |
|---|---|
| | work piece 50, 70. The center of the rolling circle lies on the rotation axis R2 of the work piece 50, 70. The diameter of the rolling circle of the work piece is $d_{w2}$.<br>The rolling circle of the skiving tool 100 (also called tool rolling circle) lies in a plane which is perpendicular to the rotation axis R1 of the skiving tool 100. The center of the rolling circle W1 lies on the rotation axis R1 of the skiving tool 100. The diameter of the tool rolling circle is $d_{w1}$. |
| reference planes chip half space, cutting edge half space | The tool reference plane is the plane, in which the tool rolling circle lies. The tool reference plane divides the three-dimensional space in two halves. The chip half space is the very half, in which the normal to the cutting face pointing out of the cutter material of the skiving tool 100 points. The other half is called cutting edge half space. The cutting edges of the skiving tool 100 thus extend essentially in the cutting edge half space, however, they may also extend into the chip half space, wherein the cutting faces are turned toward the chip half space. |
| velocity vectors | In the calculation point AP, the velocity vector $\vec{v}_2$ of the respective work piece point, which results from the rotation of the work piece about R2, can be specified. It lies in the work piece reference plane, tangentially to the work piece rolling circle. The absolute value is $v_2 = |\pi \cdot d_{w2} \cdot n_2|$ with the signed rotational speed of the work piece $n_2$.<br>In the calculation point, also the velocity vector $\vec{v}_1$ of the respective work piece point, which results from the rotation of the work piece about R1, can be specified. It lies in the tool reference plane, tangentially to the tool rolling circle. The absolute value is $v_1 = |\pi \cdot d_{w1} \cdot n_1|$ with the signed rotational speed of the tool $n_1$. |
| contact radius vectors | From the calculation point AP, the perpendicular onto the rotation axis R2 of the work piece 50, 60, 70 may be drawn. The respective foot of perpendicular corresponds to the intersection point between the work piece reference plane and the work piece rotation axis R2. The contact radius vector $\vec{r}_2$ of the work piece 50, 60, 70 is, for inner tooth systems, the vector from the foot of perpendicular to the calculation point AP, and, for outer tooth systems, the vector from the calculation point AP to the foot of the perpendicular. Its length is $|d_{w2}| / 2$.<br>From the calculation point AP, the perpendicular to the rotation axis R1 of the skiving tool 100 may be drawn. The related foot of perpendicular corresponds to the intersection point between the tool reference plane and the tool rotation axis R1. The vector from the foot of perpendicular to the calculation point AP is called contact radius vector $\vec{r}_1$ of the tool 100. Its length is $d_{w1} / 2$. |
| contact plane | The two velocity vectors $\vec{v}_2$ and $\vec{v}_1$ span the so-called contact plane. The rolling circles of the work piece 50, 70 and the skiving tool 100 contact each other in this contact plane, and namely in the calculation point AP. Further in this contact plane, also the theoretical rolling surface of the tooth system of the work piece 50, 70 and the rolling circle of the skiving tool 100 contact each other in this contact plane according to the design. More specifically, the contact plane is tangential to the mentioned rolling surface of the tooth system of the work piece 50, 70, and namely in the calculation point AP. |
| pitch surface, reference pitch surface | The pitch surface of a tooth system is also called reference pitch surface. It runs through the calculation point AP, is rotational-symmetric with respect to the rotation axis R2 of the work piece 50, 70 and reflects a portion of the basic geometry of the tooth system. The rolling circle of the work piece is a part of the pitch surface of the tooth system of the work piece 50, 70. For the cylindrical tooth systems described herein in detail and shown in the figures, the pitch surface is a cylinder, for conical tooth systems a cone, for plane tooth systems a plane and for general special tooth systems such as e.g. for hypoid gears, a hyperboloid. The explanations given in the following in relation with cylindrical tooth systems may be transferred correspondingly to other tooth systems. |
| contact plane normal | The contact plane normal $\vec{n}$ is the normal vector of the contact plane which is anchored in the calculation point AP and which points into the tooth system of the work piece 50, 70, i.e. from the head section to the foot section of the tooth system. For outer tooth systems on the work piece 50, 70, the contact plane normal $\vec{n}$ thus points to the rotation axis R2 of the work piece 50, 70, while it points away therefrom for inner tooth systems. For cylindrical tooth systems, the contact plane normal points in the same direction as the contact radius vector $\vec{r}_2$ of the work piece 50, 70, i.e., $\vec{n}$ and $\vec{r}_2$ differ only by their length. |
| projection of contact plane | The view of the work piece 50, 70 and the skiving tool 100 in the direction of the contact radius vector $\vec{r}_2$ of the work piece 50, 60, 70 is called projection of contact plane.<br>The projected rotation axis R1 and R2 intersect each other in the projection of contact plane in the calculation point AP respectively in the contact point BP. |

TABLE 2-continued

Terms Concerning the Contact between the Skiving Tool and the Work Piece

| | |
|---|---|
| effective intersection angle of axes | The effective intersection angle of axes $\Sigma_{\it eff}$ is the angle which is enclosed by the two velocity vectors $\vec{v}_2$ and $\vec{v}_1$ according to $\cos(\sum_{\it eff}) = \frac{\vec{v}_2 \cdot \vec{v}_1}{|\vec{v}_2||\vec{v}_2|}$. According to an aspect of the invention, the following holds: $90 < \Sigma_{\it eff} < 90°$, $\Sigma_{\it eff} \ne 0°$. The effective intersection angle of axes $\Sigma_{\it eff}$ carries a sign like the intersection angle of axes $\Sigma$. The sign is defined as follows without limitation of the generality: For outer tooth systems, the effective intersection angle of axes $\Sigma_{\it eff}$ is positive, if the velocity vectors $\vec{v}_1$ and $\vec{v}_2$ and the contact plane normal $\vec{n}$ form, in this succession, a right-handed trihedron. For inner tooth systems, it is positive, if the velocity vectors $\vec{v}_1$ and $\vec{v}_2$ and the contact plane normal $\vec{n}$ form, in this succession, a left-handed trihedron. For non-planar tooth systems, the effective intersection angle of axes $\Sigma_{\it eff}$ corresponds to the perpendicular projection of the intersection angle of axes $\Sigma$ onto the contact plane, hence the intersection angle of axes $\Sigma$ in the projection of contact plane. |
| tilt angle | The tilt angle $\delta$ describes the tilt (with respect to inclination) of the tool reference plane and thus of the skiving tool 100 with respect to the contact plane. It is the angle enclosed by the contact radius vector $\vec{r}_1$ of the skiving tool 100 and the contact plane perpendicular $\vec{n}$ according to $\cos(\delta) = \frac{\vec{n} \cdot \vec{r}_1}{|\vec{n}||\vec{r}_1|}$ wherein $-90° \le \delta \le 90°$. The tilt angle $\delta$ is identical to the intersection angle (which is smaller in respect of its absolute value) between the rotation axis R1 of the skiving tool 100 and the contact plane. The tilt angle $\delta$ is $0°$, if the tool reference plane is perpendicular to the contact plane and the tool rotation axis R1 hence runs parallel to the contact plane. The tilt angle $\delta$ carries a sign. The tilt angle $\delta$ is positive, if the rotation axis R1 of the skiving tool 100 intersects the contact plane in the chip cutting half space. The tilt angle $\delta$ is negative, if the rotating axis R1 of the skiving tool 100 intersects the contact plane in the cutting edge half space. |

There are further projections which are employed for illustrating the invention. The according projections are explained in Table 3 below.

TABLE 3

Further Projections

Figure 4B:
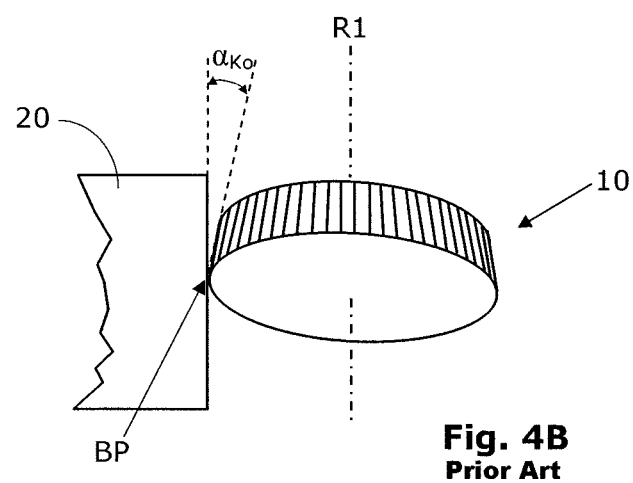
FIG. 4B shows a schematic projection of intersection of axes (side projection of contact plane) of the prior art conical skiving tool and the work piece according to FIG. 4A.
Figure 6B:
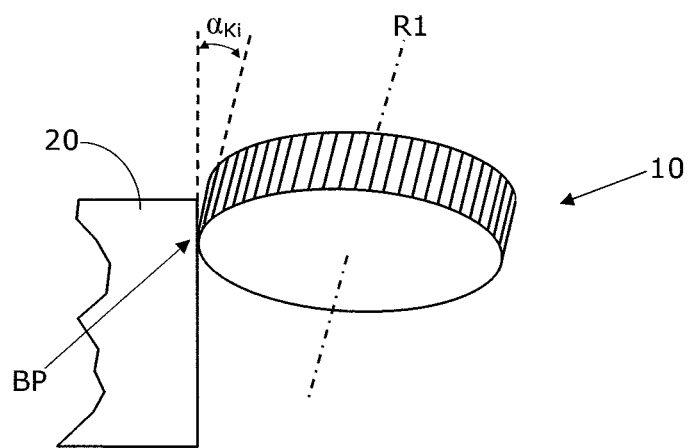
FIG. 6B shows a schematic side projection of contact plane of the prior art cylindrical skiving tool and work piece according to FIG. 6A.
Figure 7A:
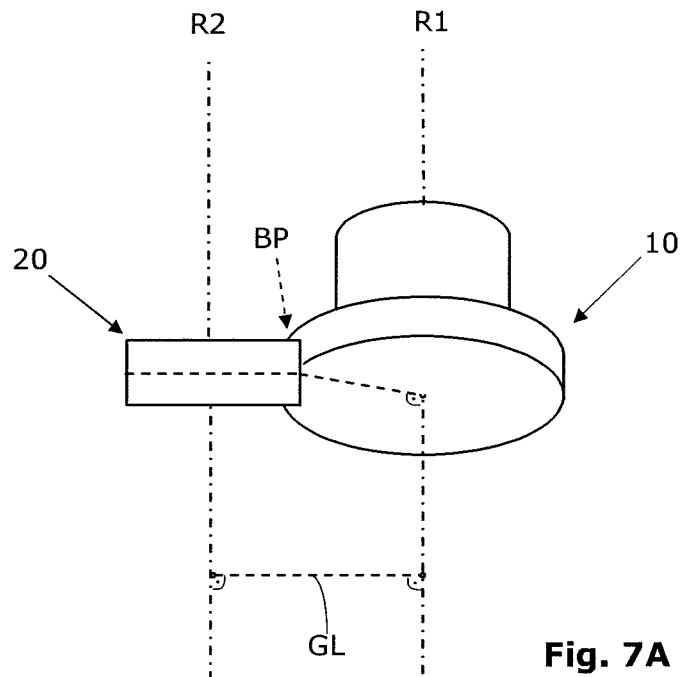
FIG. 7 shows a schematic side projection of intersection of axes of a further prior art cylindrical skiving tool during the skiving of a work piece having an outer tooth system, wherein the skiving tool is inclined away from the work piece with a small angle.
FIG. 7B shows a schematic side projection contact plane of the prior art cylindrical skiving tool and work piece according to FIG. 7A.
Figure 7B:
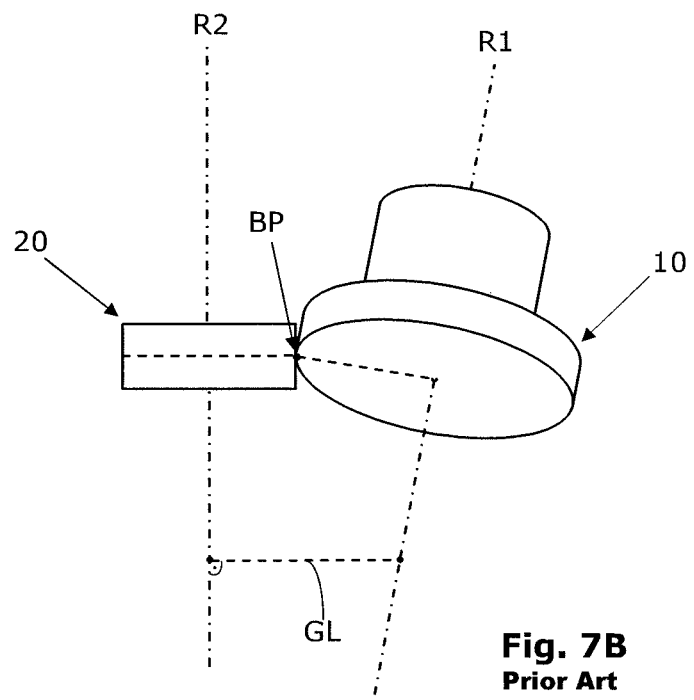
Figure 8A:
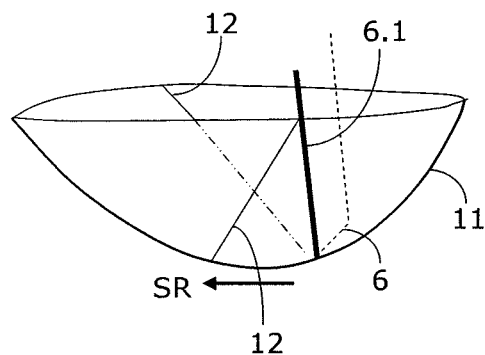
FIG. 8A shows the result of a simulation of the relative movement of a cutting tooth of a prior art skiving tool in the material of a work piece in a first snap shot.
Figure 8B:
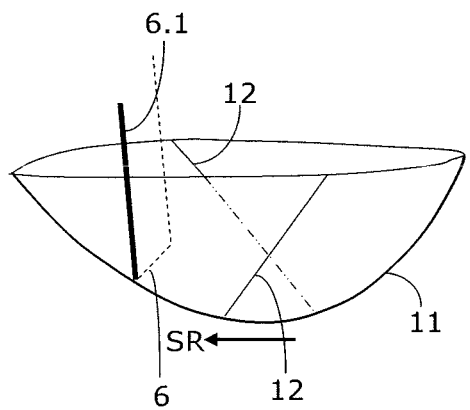
FIG. 8B shows a second snap shot of the simulation, wherein the cutting tooth of the prior art skiving tool has moved a distance further in the cutting direction to the left-hand side in the material of the work piece with respect to the situation in FIG. 8A.
Figure 8C:
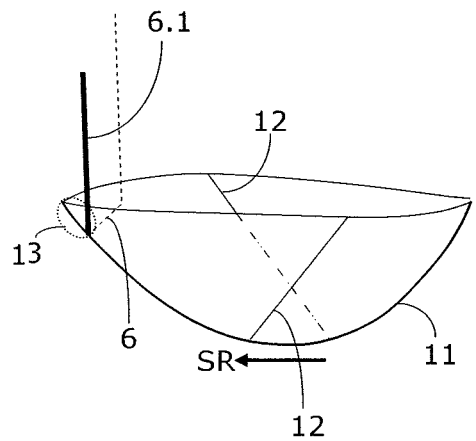
FIG. 8C shows a third snap shot of the simulation, wherein the cutting tooth of the prior art skiving tool has moved further in the cutting direction to the left-hand side in the material of the work piece with respect to the situation in FIG. 8B.
Figure 9:
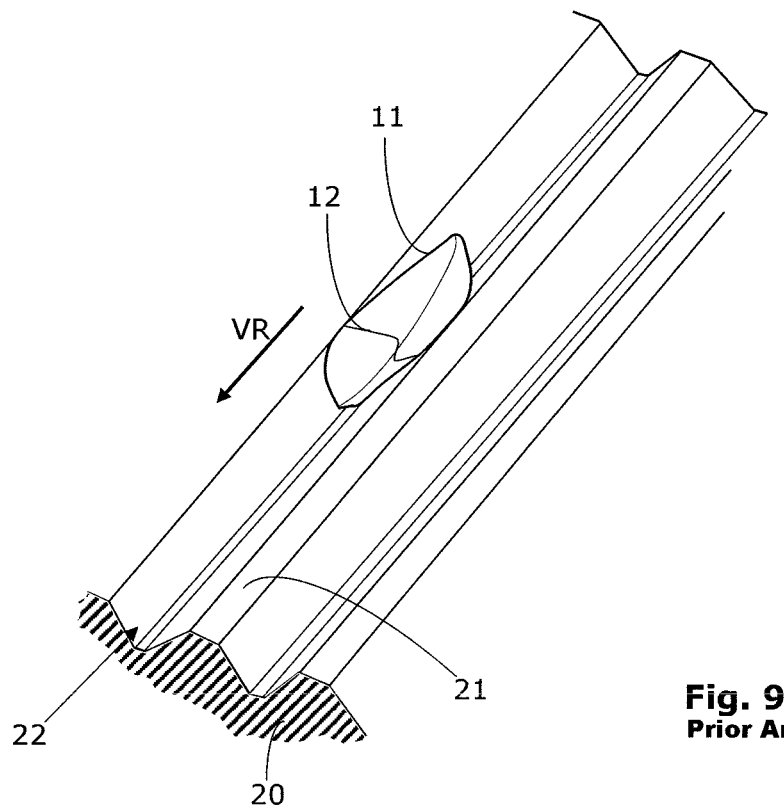
FIG. 9 shows a section of a work piece comprising plural teeth and tooth gaps, wherein a trough according to the FIGS. 8A to 8C proceeds through the tooth gap.

| | |
|---|---|
| side projection of intersection of axis | The side projection of intersection of axis vector (see e.g. FIG. 4B and 7A) is the particular vector perpendicular to the joint plumb GL and the rotation axis R2 of the work piece 50, 70, which encloses an acute angle with the velocity vector $\vec{v}_2$ of the contacting work piece point. Then the viewing of the work piece 50, 70 and the skiving tool 100 in the direction of this side projection of intersection of axis vector is called side projection of intersection of angles. In the side projection of intersection of angles, the projected rotation axis R1 and R2 run parallel to each other. |
| side projection of contact plane | The view of the work piece 50, 70 and the skiving tool 100 in the direction of the velocity vector $\vec{v}_2$ of the contacting work piece point is called side projection of contact plane (see e.g. FIGS. 4B, 6B and 7B). |

The following equation [1] provides the relationship between the angles describing the special arrangement of the rotation axes R1 and R2 for non-planar tooth systems and is thus important for the conversion of the individual quantities:

$$\cos(\Sigma) = \cos(\Sigma_{\it eff}) \cdot \cos(\delta) \quad [1]$$

In this generalized constellation, the intersection angle of axes $\Sigma$ is decomposed in the effective intersection angle of axes $\Sigma_{\it eff}$ and the tilt angle $\delta$, whereby the effective intersection angle of axes $\Sigma_{\it eff}$ is the determining quantity for the generation of the relative cutting movement between the rotating skiving tool 100 and the rotating work piece 50, 70. For planar tooth systems, the effective intersection angle of axes $\Sigma_{\it eff}$ and the tilt angle $\delta$ are well defined, however, the relationship [1] does not hold.

According to an aspect of the invention, a tilt angle $\delta$ can be prescribed, the absolute amount of which is different from zero degree, i.e., the inclination of the tool reference plane and hence of the skiving tool 100 with respect to the contact plane (which is spent by the two velocity vectors $\vec{v}_2$ and $\vec{v}_1$) is negative or positive. Thus, in relation with the present invention, one speaks of a tilt (or an inclination) of the skiving tool 100 toward or away from the work piece 50, 70. The tilt toward or tilt away is, however, optional.

The effective intersection angle of axes $\Sigma_{\it eff}$ may lie in the following ranges: $-60° \le \Sigma_{\it eff} < 0$ and $0 < \Sigma_{\it eff} \le 60°$.

According to an aspect of the invention, a so-called modified infeed method is concerned, which is employed in relation with the skiving of a work piece 50, 70, whereby in this skiving a rotational-symmetric periodic structure, e.g. an outer or inner tooth system, is to be manufactured on the work piece 50, 70 under application of a skiving tool 100. As shown in the FIGS. 11, 12A and 12B, the modified infeed method is characterized in particular in that the following steps are performed simultaneously and in a coordinated way:

rotating the skiving tool 100 about a first rotation axis R1 and coupledly rotating the work piece 50, 70 about a second rotation axis R2, setting-in the skiving tool 100 with a radial first movement component in the direction of the work piece 50, 70 and infeeding the skiving tool 100 with a radial second movement component in the direction of the work piece 50, 70, for example, down to the full depths, whereby at least during the infeed, the first rotation axis R1 extends skew with respect to the second rotation axis R2 respectively the two rotation axes R1, R2 are lined skew relative to each other.

Subsequently, the execution of a relative feed motion of the rotating skiving tool 100 in the feed direction VR follows starting from the reaching of the full depth with respect to the rotating work piece 50, 70, wherein also during the skiving, the first rotation axis R1 extends skew with respect to the second rotation axis R2, respectively the two rotation axes R1, R2 are lined skew relative to each other.

In some embodiments, a negative or positive tilt angle δ is described at least during the infeed.

According to an aspect of the invention, the skiving tool 100 has cutting edges, which are formed in the shape of cutting teeth 111 protruding outwardly, as can be seen e.g. in the FIGS. 15, 16 and 17. The cutting faces of the cutting teeth 111 are formed substantially with respect to the front surface of the tapering skiving tool 100.

According to an aspect of the invention, the skiving tool 100 has the shape of a generating cutter, such as the shape of a disk-type generating cutter, a shank-type generating cutter or a deep counterbore-type generating cutter (e.g. according to DIN 3972 or DIN 5480). An adapter element may be arranged between the skiving tool 100 and the proper tool spindle 170, which can be seen in FIG. 18.

The skiving tool 100 may have a cylindrical shell shape or a base shape having a collision contour, which is designed to avoid collisions between the skiving tool 100 and the work piece 50, 70.

In FIG. 17, a skiving tool 100 is shown, which has the shape of a generating cutter. Here, a massive tool is concerned, in which the cutting teeth 111 are part of the skiving tool 100. Here, the skiving tool 100 has 25 cutting teeth 111, of which one is provided with a reference sign in FIG. 17. The base body of the skiving tool 100 has the shape of a truncated cone disk or a truncated cone plate.

Beside the kinematic aspects and conditions which result from the prescription of the desired relief angles, the consistency of the work piece 50, 70 also plays a role which is important. There are always work pieces 50, 70, for which a section having a diameter that is greater than the foot circle diameter follows up the tooth system or periodic structure, and which thus permit only a low infeed or overrun in the manufacturing of a tooth system or another periodic structure. Here, the method according to the invention can be applied particularly advantageously, because in the radial infeed according to FIG. 11, less space in the infeed section is required then in the axial setting-in or in the superimposed setting-in according to WO 2010/060733 A1. Analogously, the invention can be applied to work pieces, which permit only a low overrun. In this case, the skiving tool 100 is drawn back radially directly after the reaching of the final shape of the tooth gap.

A machine 200 which is designed for the setting-in, infeed and the subsequent skiving, comprises a CNC control unit 201, which enables a coupling of the axes R1 and R2, respectively a coordination of the axes movements. The CNC control unit 201 can be a part of the machine 200 or it can be implemented externally and designed for a communication-specific connection 202 concerning with the machine 200. The according machine 200 comprises a so-called "electronic gear train" respectively a "electronic or control-specific coupling of axes" in order to perform a relative movement of the skiving tool 100 with respect to the inner toothed, power skived work piece 70. The coupled movement of the skiving tool 100 and the work piece 70 is performed such that during the manufacturing phase a relative movement between the skiving tool 100 and the work piece 70 results, which corresponds to the relative movement of a helical gear transmission. The electronic gear train, respectively the electronic or control-specific coupling of axes provides for a synchronization of the rotation speed of at least two axes of the machine 200. At least the rotation axis R1 of the tool spindle 170 is coupled with the rotation axis R2 of the work piece spindle 180 here. In addition, preferably in all embodiments, the rotation axis R2 of the work piece spindle 170 is coupled with the axial feed in the direction R2. The vertical linear movement of a linear feed 203 is represented by a double arrow 204 in FIG. 18. In addition, the work piece spindle 180 together with the plate 205 can be shifted linearly parallel to a swivel axis SA, as represented by a double arrow 206. The axial feed occurs parallel to the rotation axis R2 and is composed of a vertical movement component 204, which is generated by the linear feed 203, and a horizontal movement component, which is generated by a linear movement 208. In addition, the plate 205 together with the work piece spindle 180 and the work piece 170 can be rotated about the swivel axis SA, as represented by a double arrow 207.

Figure 18:
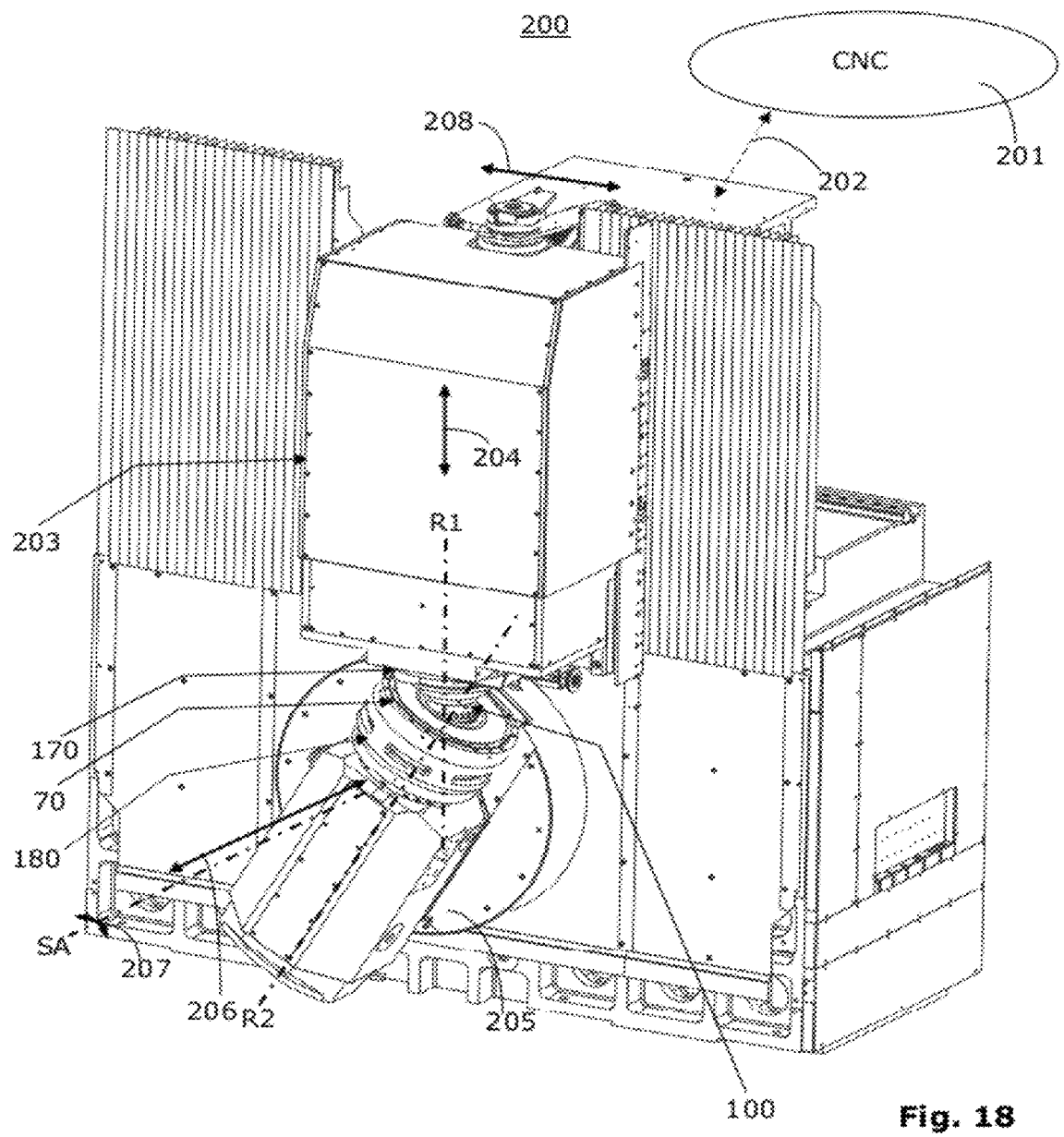
FIG. 18 shows a perspective view of a machine according to the invention, comprising a skiving tool during the tooth system of a work piece having an inner tooth system.

A machine 200 may be employed, which is based on a vertical arrangement as shown in FIG. 18. In such a vertical arrangement, either the skiving tool 100 together with the work piece spindle 170 sits above the work piece 50, 70 together with the work piece spindle 180, or vice versa. The chips, which are generated during the infeed and skiving fall downward due to the action of the gravitational force and may be removed e.g. over a chip board which is not shown.

In addition, the machine 200 which is designed for the modified setting-in and infeed according to the invention, provides for the correct complex geometric and kinematical machine settings and axes movements of the mentioned axes. The machine may have six axes. Five of these axes have been described already. As the sixth axis, an axis can be conceived, which enables a linear relative movement of the skiving tool 100 with respect to the work piece 50, 70. This linear relative movement is indicated in FIG. 18 by a double arrow 208.

The modified infeed method can be applied dry or wet, wherein the use of the modified infeed method in relation with the dry skiving is preferred.

The spectrum of application of the modified infeed is large and extends to the application in the manufacturing of the most different rotational-symmetric periodic structures.

As may be recognized by those of ordinary skill in the pertinent art based on the teachings herein, numerous changes and modifications may be made to the above-described and other embodiments of the present invention without departing from the scope of the invention as defined in the claims.

What is claimed is:

1. A method for skiving a work piece having a rotational-symmetric, periodic structure utilizing a skiving tool, the method comprising the following steps performed before skiving:

rotating the skiving tool about a first rotation axis, coupledly rotating the work piece about a second rotation axis with said rotation of the skiving tool, radially feeding the skiving tool in a direction toward the work piece to bring the skiving tool in contact with the work piece for a first time, infeeding the skiving tool in a radial plunging motion in the direction toward the work piece from the moment of the first contact down to a predetermined depth, wherein at least during the infeeding step the first and second rotation axes are skewed relative to each other, and upon reaching the predetermined depth, advancing the skiving tool by axially advancing the skiving tool in the direction of the second rotation axis and differentially advancing the skiving tool relative to the rotating work piece at least during the infeeding of the skiving tool, wherein the first and second rotation axes are also skewed relative to each other during the advancing step.

2. A method according to claim 1, further comprising the step of inclining the skiving tool toward the work piece or away from the work piece at least during the infeeding step.

3. A method according to claim 1, further comprising the step of arranging the skiving tool and the work piece with respect to one another to define an effective intersection angle between the first and second rotation axes within the range of about −60° to about 0° or about 0° to about 60°.

4. A method according to claim 1, further comprising the step of providing a work piece defining a rotational-symmetric periodic structure including a tooth system having interior teeth or a tooth system having exterior teeth of the work piece.

5. A method according to claim 1, further comprising the step of providing a cylindrical work piece.

6. A method according to claim 1 wherein the infeeding step includes first contacting the work piece with the skiving tool in a region between a front side and a lateral area of the work piece.

7. A method according to claim 1, wherein the infeeding step includes infeeding the skiving tool down to a predetermined depth in one cut.

8. An apparatus for skiving a work piece having a rotational-symmetric, periodic structure utilizing a skiving tool, the apparatus comprising:
   a tool spindle rotatable about a first rotation axis and configured to support the skiving tool,
   a work piece spindle rotatable about a second rotation axis and configured to support the work piece,
   numerically controlled drives configured for coupledly performing a relative movement between the skiving tool and the work piece and coupledly rotating the skiving tool together with the tool spindle about the first rotation axis and the work piece together with the work piece spindle about the second rotation axis,
   wherein the apparatus one of 1) further includes a numerical control and 2) is operatively connectable with a numerical control, the numerical control adapted to, prior to the skiving:
      radially feed the skiving tool to bring the skiving tool in contact with the work piece and then plunge the skiving tool radially relative to the work piece down to a predetermined tooth depth,
      upon reaching the predetermined tooth depth, advance the skiving tool by axially advancing the skiving tool in the direction of the second rotation axis and differentially advancing the skiving tool relative to the rotating work piece at least during the plunging of the skiving tool, and
      at least during the plunging, skewing the first rotation axis with respect to the second rotation axis.

9. An apparatus according to claim 8, further comprising a skiving tool having cutting edges in the form of cutting teeth and projecting obliquely outwards.

10. An apparatus according to claim 8, further comprising a skiving tool defining the shape of a disc-type generating cutter, a shank-type generating cutter, or a deep counterbore-type generating cutter.

11. An apparatus according to claim 8, wherein the numerical control is adapted to, during the plunging and skiving, tilt or incline the skiving tool toward or away from the work piece.

12. An apparatus according to claim 8, wherein the apparatus comprises a machine having six axes of movement.

13. An apparatus according to claim 8, further including a skiving tool comprising a massive tool or a bar cutter skiving wheel.

* * * * *